US008081948B2

(12) United States Patent
Pinel et al.

(10) Patent No.: US 8,081,948 B2
(45) Date of Patent: Dec. 20, 2011

(54) ANALOG SIGNAL PROCESSOR IN A MULTI-GIGABIT RECEIVER SYSTEM

(75) Inventors: Stephane Pinel, Atlanta, GA (US); Joy Laskar, Marietta, GA (US); David Yeh, Atlanta, GA (US); Bevin George Perumana, Atlanta, GA (US); Saikat Sarkar, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 462 days.

(21) Appl. No.: 12/447,163

(22) PCT Filed: Oct. 25, 2007

(86) PCT No.: PCT/US2007/082529
§ 371 (c)(1),
(2), (4) Date: Apr. 24, 2009

(87) PCT Pub. No.: WO2008/052117
PCT Pub. Date: May 2, 2008

(65) Prior Publication Data

US 2010/0093299 A1 Apr. 15, 2010

Related U.S. Application Data

(60) Provisional application No. 60/854,128, filed on Oct. 25, 2006, provisional application No. 60/890,786, filed on Feb. 20, 2007, provisional application No. 60/895,582, filed on Mar. 19, 2007, provisional application No. 60/952,909, filed on Jul. 31, 2007.

(51) Int. Cl.
*H04B 1/16* (2006.01)

(52) U.S. Cl. ......... 455/337; 370/313; 367/134; 359/334

(58) Field of Classification Search .................. 455/293, 455/226.1, 283, 280, 330–520; 370/313, 370/219, 295, 316, 308, 298, 257, 346, 224, 370/259, 296; 367/134; 359/334
See application file for complete search history.

(56) References Cited

U.S. PATENT DOCUMENTS

| | | | | |
|---|---|---|---|---|
| 5,703,509 A | | 12/1997 | Hirata | |
| 5,943,639 A | | 8/1999 | Tanaka et al. | |
| 6,895,253 B1 | * | 5/2005 | Carloni et al. | 455/506 |
| 7,292,637 B2 | * | 11/2007 | Ho et al. | 455/280 |
| 7,583,725 B1 | * | 9/2009 | Dick | 375/219 |
| 7,672,380 B2 | * | 3/2010 | Ho et al. | 455/283 |
| 7,813,262 B1 | * | 10/2010 | Rao | 370/208 |
| 2001/0048715 A1 | | 12/2001 | Lee et al. | |

OTHER PUBLICATIONS

International Search Report for PCT Application No. PCT/US2007/082529 dated Apr. 30, 2008.

* cited by examiner

*Primary Examiner* — Lam T Mai
(74) *Attorney, Agent, or Firm* — Ryan A. Schneider, Esq.; Troutman Sanders LLP

(57) ABSTRACT

An analog multi-gigabit receiver and/or transceiver can be implemented for the reception and demodulation of multi-gigabits quadrature phase shift keying (QPSK) modulated using a CMOS (complementary metal-oxide semiconductor) process. Further, an analog multi-gigabit receiver and/or transceiver can be implemented for the reception and demodulation of multi-gigabits binary phase shift keying (BPSK), minimum shift keying (MSK), and/or amplitude shift keying (ASK) signal modulated in CMOS processes.

31 Claims, 30 Drawing Sheets

Differential Amplifier

Dual Capacity QPSK 60GHz Front-end

ANALOG SIGNAL PROCESSOR IN A MULTI-GIGABIT RECEIVER SYSTEM

CROSS-REFERENCE TO RELATED APPLICATIONS

This application claims benefit of priority under 35 U.S.C. §119(e) of U.S. Provisional Application No. 60/854,128, filed 25 Oct. 2006; U.S. Provisional Application No. 60/890,786, filed 20 Feb. 2007; U.S. Provisional Application No. 60/895,582, filed 19 Mar. 2007; and U.S. Provisional Application No. 60/952,909, filed 31 Jul. 2007, the entire contents and substance of which are hereby incorporated by reference.

BACKGROUND

1. Field of the Invention

The present invention relates to a receiver and, more particularly, to a system for synchronization of an analog signal processor in a multi-gigabit receiver system.

2. Description of Related Art

Nowadays, data is commonly transmitted wirelessly using digital modulation. Typically, a receiver receives the wireless signal, which is ultimately digitized using sampling, and then fed to a digital signal processor. Specifically, the wireless signal is received by an antenna, down converted and then sampled by a high resolution analog-to-digital converter (ADC), and finally processed by the digital signal processor (DSP).

Transmitting digital signals is efficient for data at slow speeds. For instance, transmitting using digital modulation and demodulation is preferred for data being transmitted wirelessly at less than 50 megabits per second (Mbps). When it is desired to transmit at higher speeds, i.e., higher than 50 Mbps, digital demodulation becomes undesired, as there are many problems. For instance, because there is a need for both a high-resolution, high-speed ADC and a DSP with digital demodulation, the receiver is expensive, high-power consuming, and requires an undesirable large footprint.

Instead of demodulating the wireless signal in the digital domain at high speed systems—for example, for multi-gigabit wireless transmission using an unlicensed frequency-band for high-speed data transfer between storage devices, point-to-point video, high-definition television (HDTV), and wireless personal area networking (WPAN) applications—it would be preferable to demodulate the wireless signal using analog techniques.

Specifically, QPSK (Quadrature Phase Shift Keying) can be used for optimum architecture because of higher throughput (approximately 2 bits/Hz in baseband) and less demand for signal to noise ration (SNR) per bit (approximately 10 dB for a bit error rate of $10^{-5}$). Phase shift keying can be used to digitally modulate data by changing the phase of a reference signal. In conventional architecture, however, very high-speed, high-resolution ADCs are required to sample the baseband signal and digitally enable the demodulation. In the case of multi-gigabit signal, implementation of ADCs exhibiting sampling rate more than 1 Giga-sample-per-second (Gsps) and digital functions (such as synchronization, phase and frequency tracking, ultra high-speed large-size fast Fourier transform and inverse fast Fourier transform) consume a lot of power and can cause latency issues.

For example, in the case of 7 Gbps QPSK (maximum payload possible, without filtering, with QPSK modulation within the 57-64 GHz unlicensed bandwidth), at least two ADCs exhibiting a minimum sampling at a rate of 7 Gsps are required to sample the I and Q channels (3.5 Gbps each). The result is again a large footprint, and high-power consuming system.

What is needed, therefore, is an improved system to provide a compact, robust and power-efficient analog solution for the demodulation of a multi-gigabit signal. It is to such a method, device, and system that the present invention is primarily directed.

SUMMARY

Various embodiments of the present invention relate to methods and systems for synchronizing an analog signal. Various embodiments of the present invention also relate to methods and system for generating an error signal in an analog signal processor.

An analog multi-gigabit receiver and/or transceiver can be implemented for the reception and demodulation of multi-gigabits quadrature phase shift keying (QPSK) modulated using a CMOS (complementary metal-oxide semiconductor) process. An analog multi-gigabit receiver and/or transceiver can be implemented for the reception and demodulation of multi-gigabits binary phase shift keying (BPSK), minimum shift keying (MSK), and/or amplitude shift keying (ASK) signal modulated in CMOS processes. In a preferred embodiment, a 90 nm CMOS process is can be implemented, though as one skilled in the art would appreciate other CMOS processes can be implemented.

In a first aspect, the present invention relates to an analog signal processor for analog carrier/phase recovery and synchronization. Preferably, inputs to the analog signal processor are the quadrature phase shift keying (QPSK) modulated intermediate frequency signal. The analog signal processor is adapted to synchronize a local oscillator with the intermediate frequency, enabling the demodulation in a multi-gigabit receiver. The analog signal processor includes two similar amplifiers dividers for generating an error signal that contains a control voltage for the local oscillator. The analog signal processor is a closed-loop system for synchronization purposes.

In a second aspect, the present invention relates to another analog signal processor containing capacitors for analog carrier/phase recovery and synchronization. The analog signal processor can be used to synchronize a local oscillator with the intermediate frequency in a multi-gigabit receiver. The analog signal processor includes two similar amplifiers dividers for generating an error signal that contains a control voltage for feeding the local oscillator. Each analog signal processor includes a number of capacitors that are adapted to prevent DC offset. The analog signal processor is a closed-loop system for synchronization purposes.

In a third aspect, the present invention relates to analog signal processors for BPSK/ASK, as well as MSK/ASK systems. Specifically, a low-power tri-mode solution is implemented to demodulate an incoming multi-gigabit binary phase shift keying (BPSK), minimum shift keying (MSK), and/or amplitude shift keying (ASK) signal. When working in the BPSK/ASK mode, the analog signal processor is adapted to synchronize a local oscillator to the intermediate frequency IF signal. When working in the MSK/ASK mode, the analog signal processor directly detects the incoming modulated intermediate signal, and recovers the original baseband digital signal. Further, a phase-lock loop is implemented in the analog signal processor to improve the robustness of operation against process variations during fabrication. A memory cell circuit can be implemented to prevent the phase-lock loop and the analog signal processor to work simultaneously and avoid conflict with each other.

In another aspect of the present invention, a pure analog 60 GHz CMOS multi-gigabit receiver has been implemented for the reception and demodulation of 60 GHz multi-gigabit/s QPSK modulated data.

These and other objects, features and advantages of the present invention will become more apparent upon reading the following specification in conjunction with the accompanying drawing figures.

DETAILED DESCRIPTION OF THE DRAWINGS

Figure 1:
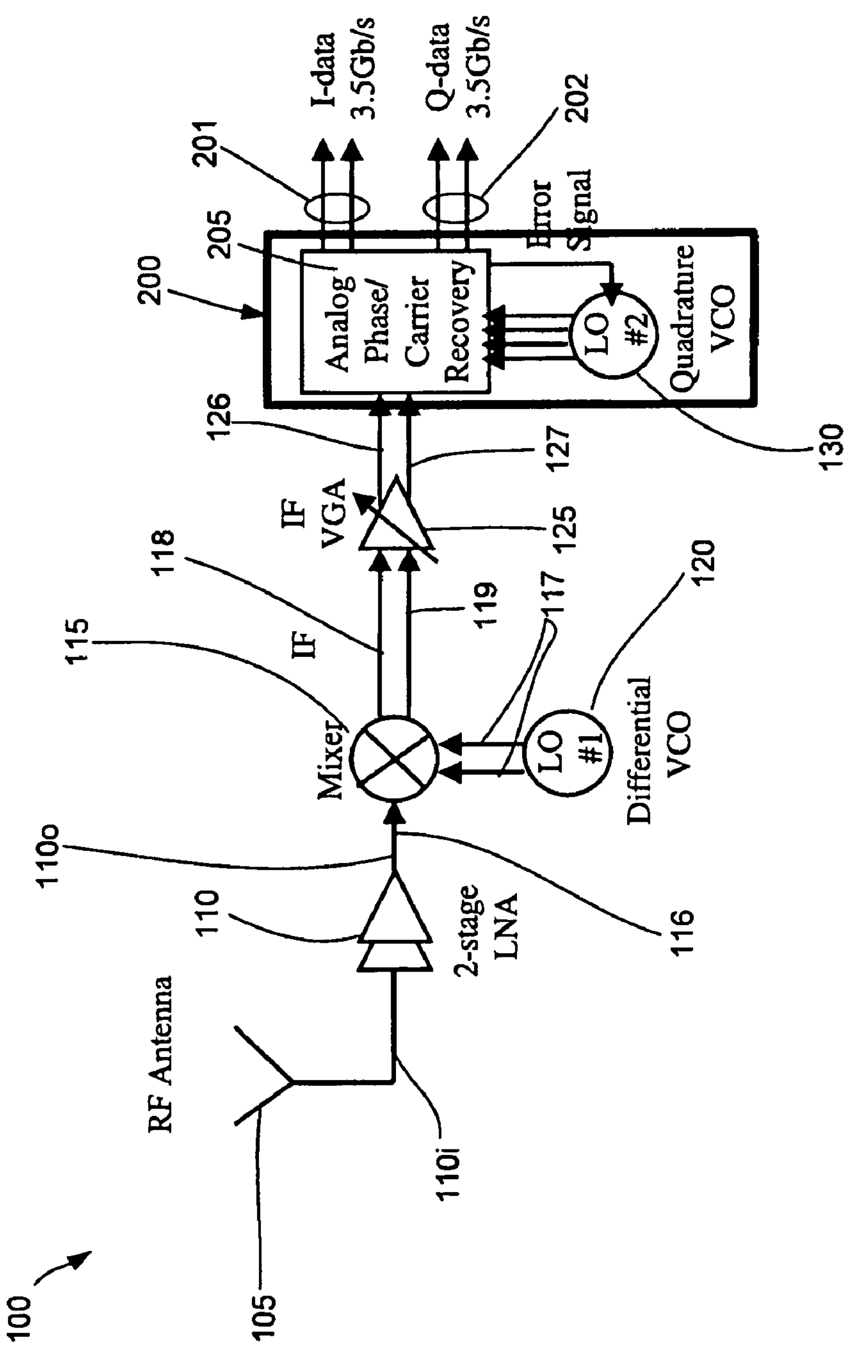
FIG. 1 illustrates a system level block diagram of a multi-gigabit receiver.

Various embodiments of the present invention relate to methods and systems for synchronizing an analog signal. Various embodiments of the present invention also relate to methods and systems for generating an error signal in an analog signal processor.

An analog multi-gigabit receiver and/or transceiver can be implemented for the reception and demodulation of multi-gigabits quadrature phase shift keying (QPSK) modulated using a CMOS (complementary metal-oxide semiconductor) process. An analog multi-gigabit receiver and/or transceiver can be implemented for the reception and demodulation of multi-gigabits binary phase shift keying (BPSK), minimum shift keying (MSK), and/or amplitude shift keying (ASK) signal modulated in CMOS processes. In a preferred embodiment, a 90 nm CMOS process is can be implemented, though as one skilled in the art would appreciate other CMOS processes can be implemented.

In a first aspect, the present invention relates to an analog signal processor for analog carrier/phase recovery and synchronization. Preferably, inputs to the analog signal processor are the quadrature phase shift keying (QPSK) modulated intermediate frequency signal. The analog signal processor is adapted to synchronize a local oscillator with the intermediate frequency, enabling demodulation in a multi-gigabit receiver. The analog signal processor includes two similar amplifiers dividers for generating an error signal that includes a control voltage for the local oscillator. The analog signal processor is a closed-loop system for synchronization purposes.

In a second aspect, the present invention relates to another analog signal processor containing capacitors for analog carrier/phase recovery and synchronization. The analog signal processor can be used to synchronize a local oscillator with the intermediate frequency in a multi-gigabit receiver. The analog signal processor includes two similar amplifiers dividers for generating an error signal that contains a control voltage for feeding the local oscillator. Each analog signal processor includes a number of capacitors that are adapted to prevent DC offset. The analog signal processor is a closed-loop system for synchronization purposes.

In a third aspect, the present invention relates to analog signal processors for BPSK/ASK, as well as MSK/ASK systems. Specifically, a low-power tri-mode solution is implemented to demodulate an incoming multi-gigabit binary phase shift keying (BPSK), minimum shift keying (MSK), and/or amplitude shift keying (ASK) signal. When working in the BPSK/ASK mode, the analog signal processor is adapted to synchronize a local oscillator to the intermediate frequency IF signal. When working in the MSK/ASK mode, the analog signal processor directly detects the incoming modulated intermediate signal, and recovers the original baseband digital signal. Further, a phase-lock loop is implemented in the analog signal processor to improve the robustness of operation against process variations during fabrication. A memory cell circuit is implemented to prevent the phase-lock loop and the analog signal processor to work simultaneously and avoid conflict with each other. The memory cell circuit can also be implemented in the analog signal processor used to synchronize the QPSK signal.

Having described different aspects of the present invention, an exemplary environment that surrounds the analog signal processor will now be described, e.g., the receiver module.

Receiver Module

Referring now to the figures, wherein like reference numerals represent like parts throughout the view, embodiments of the present invention will be described in detail.

FIG. 1 illustrates a system level circuit of a multi-gigabit receiver system. As illustrated in FIG. 1, the receiver system 100 can include an antenna 105, a low noise amplifier 110, a mixer 115, a first local oscillator 120, a variable gain amplifier 125, an analog signal processor 200, and a second local oscillator 130.

The antenna 105 is preferably a radio frequency antenna that is adapted to receive data being transmitted wirelessly between 57-64 (currently an unlicensed bandwidth), 71-76 and/or 81-86 GHz. These frequencies are spectrums of the currently-available unlicensed bandwidths, and are preferred frequencies. Of course, as other frequencies become available, and as one skilled in the art would appreciate, other frequencies may be sought for implementation. The signal 110*i* received from the antenna 105 is transmitted, or fed, to the low noise amplifier 110.

The low noise amplifier (LNA) is a type of amplifier used to amplify weak signals captured by the antenna 105. Preferably, the low noise amplifier 110 in system 100 is a two-stage low noise amplifier. Using the LNA 110, the noise of subsequent stages of the receiver system 100 can be reduced by the gain of the LNA 110, and the noise of the LNA 110 can be injected directly into the received signal. Thus, the LNA 110 can boost the desired signal power while adding as little noise and distortion as possible, so that the retrieval of this signal is possible at the later stages in the system 100. The LNA 110 receives the input 110*i* from the antenna 105, and provides a single output 110*o*. The output 110*o* of the LNA 110 is fed to the mixer 115.

The mixer 115 receives a first input 116 from the output 110*o* of the LNA 110 and inputs 117 from the first local oscillator 120, which is preferably a differential voltage controlled oscillator (differential VCO). The mixer 115 is a device for mixing two or more signals. Preferably, the mixer 115 is a multiplying mixer that multiplies the input signals together, and thus produces an output containing both original signals and new signals. The mixer 115 can produce two outputs 118 and 119. Exemplary mixers that can be used include diode mixers, Gibert-cell mixers, diode ring mixers, and switching mixers. For instance, Gilbert-cell mixers comprise an arrangement of transistors that multiplies two signals. The outputs 118 and 119 of the mixer 115 are input into the variable gain amplifier 125. The result of the mixer 115 includes the intermediate frequencies (IF).

The IF variable gain amplifier (VGA) 125 is an amplifier that varies its gain depending on its control voltage (CV). The IF VGA 125 can receive the two outputs 118 and 119 of the mixer 115 and amplify the signals to produce two outputs 126 and 127. These outputs 126 and 127 from the IF VGA 125 can be fed into the analog signal processor 200.

The analog signal processor 200 can comprise analog phase/carrier recovery system 205, as well as a QVCO 130. An error signal from the analog phase/carrier recovery system 205 can be fed to the second local oscillator 130, which can be fed back into the analog phase/carrier recovery system 205. This is, in essence, a loop. Preferably, the second oscillator 130 comprises a quadrature voltage controlled oscillator (QVCO). The analog signal processor 200 can output I-data 201 and Q-data 202.

In a preferred embodiment of the present invention, an analog 60 GHz CMOS multi-gigabit receiver and/or transceiver 100 is adapted to receive and demodulate multi-gigabits quadrature phase shift keying (QPSK) modulated data, preferably using a 90 nm CMOS process. The front-end of the receiver/transceiver, which comprises the LNA 110 and the mixer 115, preferably a Gilbert-cell single-balanced mixer, is adapted to perform a first frequency down-conversion for superheterodyne architecture into IF. For example, the range of the IF can be approximately 6.5 GHz-13.5 GHz. The IF VGA 125 can increase the dynamic range of the receiver. This design is adapted to use an analog signal processor 200 to synchronize the local oscillator 130 for IF demodulation.

In one aspect, an approximate 10 GHz IF with a 3.5 Gbps pseudo-random binary sequence (PRBS) in each of the channels (I/Q), i.e., approximately 7 Gbps QPSK, can be obtained with the system illustrated in FIG. 1. The system is scalable to a large extent in terms of carrier frequency (IF) and data rate. In addition, this system can support quadrature amplitude modulation (QAM)-16 modulation scheme for approximately 14 Gbps total throughput within the approximately 57-64 GHz RF frequency range for a receiver signal-to-noise-ratio (SNR) greater than 16 dB. The result is a single-chip monolithic integration of a multi-gigabit analog carrier/phase recovery and synchronization scheme.

Beneficial features of this circuit, among others, include: pure analog implementation eliminating the need for high speed ADC to sample multi-gigabit I/Q signal; enabling approximately 7 Gbps QPSK wireless transmission through a 60 GHz band and enabling approximately 14 Gbps QAM, if the SNR is greater than 16 dB; phase/carrier recovery and synchronization with a greater than approximately 50 MHz lock-range; and total power consumption around only approximately 250 mW, which can ultimately be reduced to 150 mW or less.

Prior Art—Costas Loop

A conventional design technique to synchronize the second local oscillator 130 for IF demodulation is to provide a feedback loop. A conventional solution, often referred to as the Costas' loop, provides a feedback loop to control voltage on the local oscillator, e.g., the second local oscillator 130. The present invention improves on the prior art Costas' loop system, a schematic of which is illustrated in FIG. 2.

Figure 2:
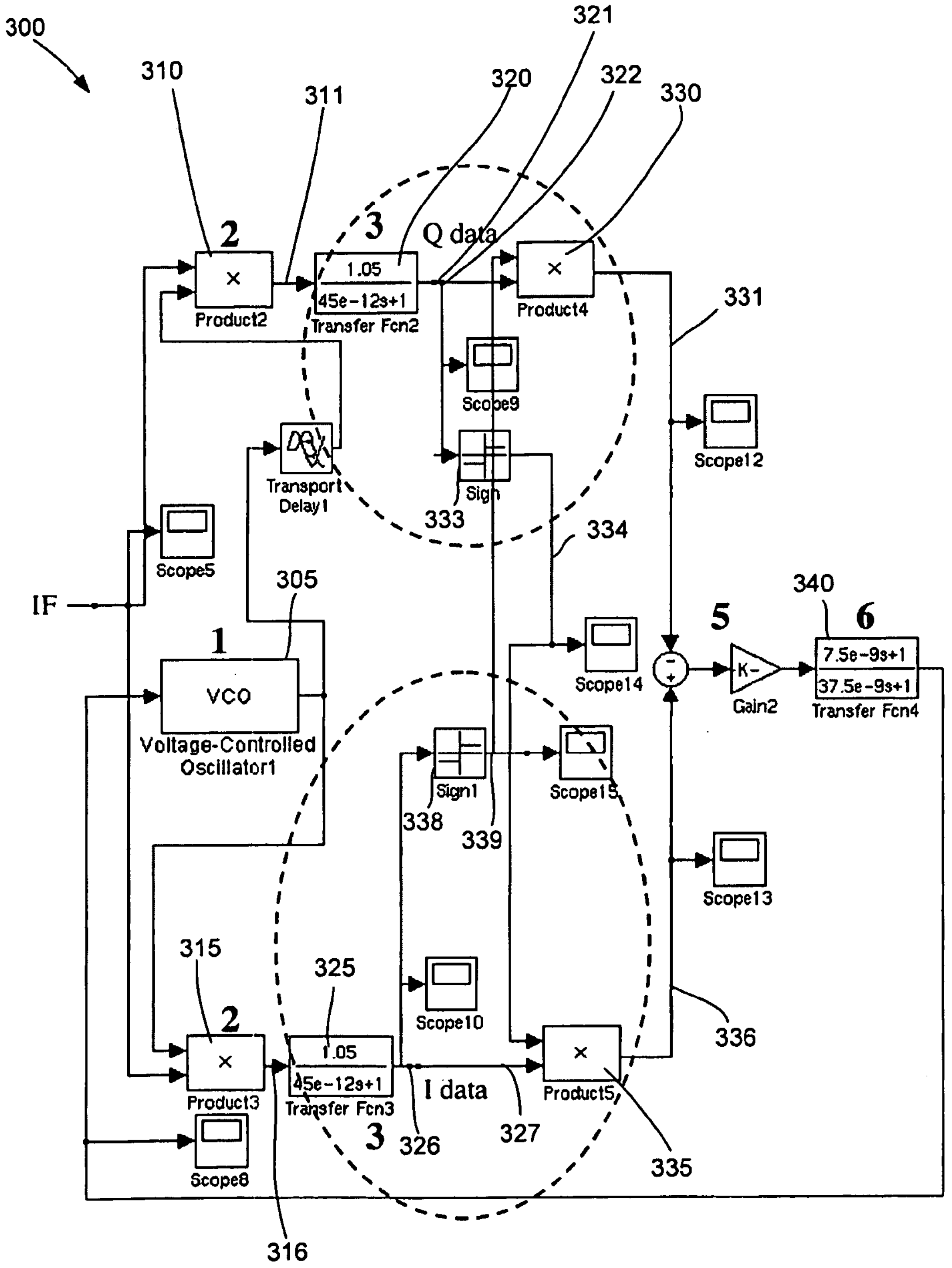
Fig. 2 Prior Art
FIG. 2 illustrates a block diagram of a conventional loop system for controlling an oscillator frequency, i.e., a conventional Costas' loop.

As shown in FIG. 2, a Costas' loop system 300 is a phase-locked loop used for carrier phase recovery from suppressed-carrier modulation signals, such as from double-sideband suppressed carrier signals. In the conventional implementation of the Costas' loop system 300, a local voltage-controlled oscillator 305 provides quadrature outputs, one to each of two multipliers 310 and 315. The same phase of the input signal is also applied to both multipliers 310 and 315, and the output 311 and 316 of each multiplier is passed through low pass filters 320 and 325, respectively. The outputs 321 and 326 of these low-pass filters 320 and 325, respectively, are inputs 322 and 327 to multipliers 330 and 335, respectively. Inputs 322 and 327 are also passed through limiter function circuits 333 and 338, respectively. Outputs 334 and 339 of the limiter function circuits 333 and 338, respectively, are also input of the multiplier 335 and 330, respectively, to be multiplied with the inputs 322 and 327 of the low pass filters. The difference between the outputs 331 and 336 of the multipliers 330 and 335, respectively, is amplified and passed through a loop filter 340 before being used to control the voltage-controlled oscillator 305.

Here, the Costas' loop system 300 has been modified and improved for multi-gigabit coherent demodulation. Accordingly, FIG. 3 provides a first exemplary schematic for implementation of such a solution.

Analog Signal Processor

Figure 3:
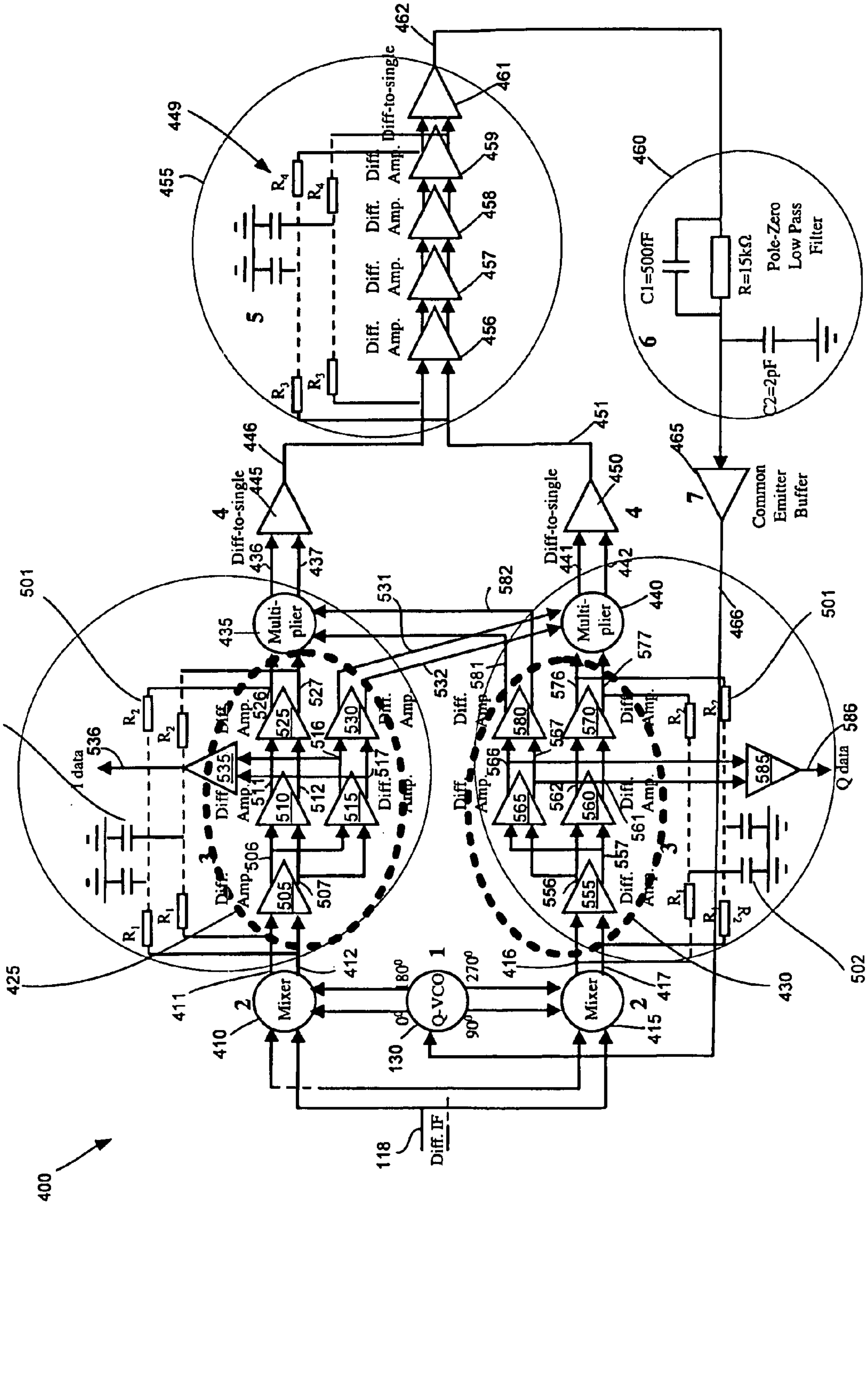
FIG. 3 illustrates a schematic of an analog signal processor, in accordance with an exemplary embodiment of the present invention.

FIG. 3 illustrates a schematic of an analog signal processor 400, in accordance with an exemplary embodiment of the present invention. The analog signal processor 400 can include a IF 118, first and second mixers 410 and 415, the quadrature voltage controlled oscillator (QVCO) 130, a first amplifier divider 425, a second amplifier divider 430, analog multipliers 435 and 440, differential-to-single-ended converters 445 and 450 (also referred to as a differential-to-single-ended amplifier), high gain differential amplifier 455, low pass filter 460, and a common emitter buffer 465. The analog signal processor 400 is preferably a loop for controlling the voltage on the QVCO 130.

The receiver system 100 of FIG. 1 can include the analog signal processor 400 of FIG. 3 for synchronizing and demodulating the signal received by the antenna 105.

Referring to FIG. 3, the IF 118 is provided to the analog signal processor 400. Preferably, the IF 118 can be a differential intermediate frequency. The IF 118 is fed into both the first and second mixers 410 and 415.

Figure 6:
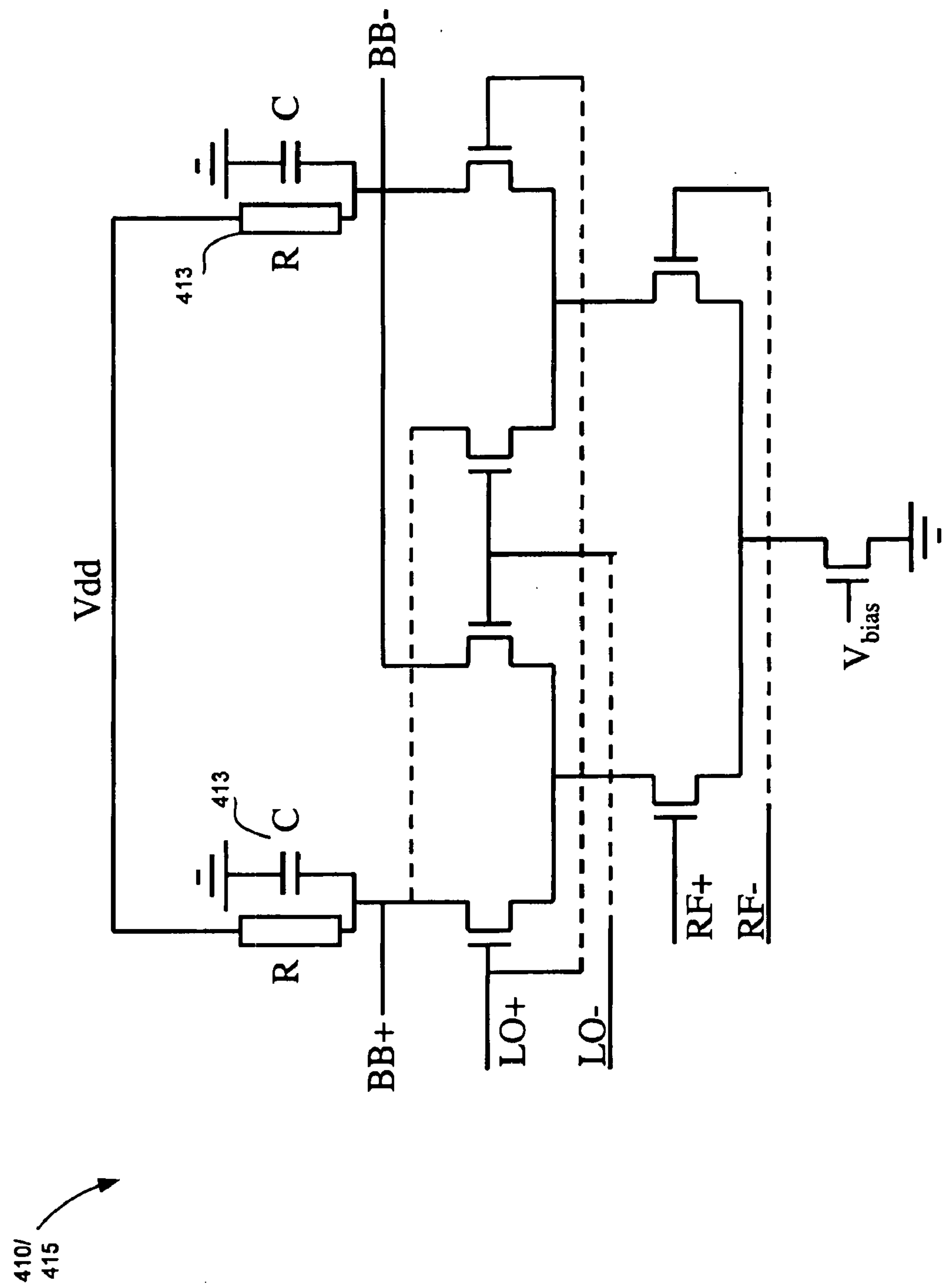
FIG. 6 illustrates a schematic of a double-balanced mixer, in accordance with an exemplary embodiment of the present invention.

Each of the mixers 410 and 415 are preferably double-balanced down-conversion Gilbert-cell mixers and can be used in both the I and Q paths for IF 118 to baseband conversion. For instance, FIG. 6 illustrates a schematic of a double-balanced mixer. In the double-balanced mixer, the QVCO 130 provides the differential LO (local oscillator) input to each of the mixers 410 and 415. The differential IF signal 118 is connected to differential RF inputs of the mixers 410 and 415. The differential baseband output of the mixer may not contain the 1×LO frequency component. A low-pass parallel RC network 413 can be used as the load with cut-off frequency of approximately 6.4 GHz to reduce the 2×LO leakage. Preferably, the bandwidth of the mixers 410 and 415 implemented in a 90 nm CMOS process is much higher than the data bandwidth. Consequently, the loop works for a wide range of IF frequencies and data rates. The output of the mixers 410 and 415 are directly DC-coupled to the next stage. All the subsequent stages are DC-coupled.

Figure 4:
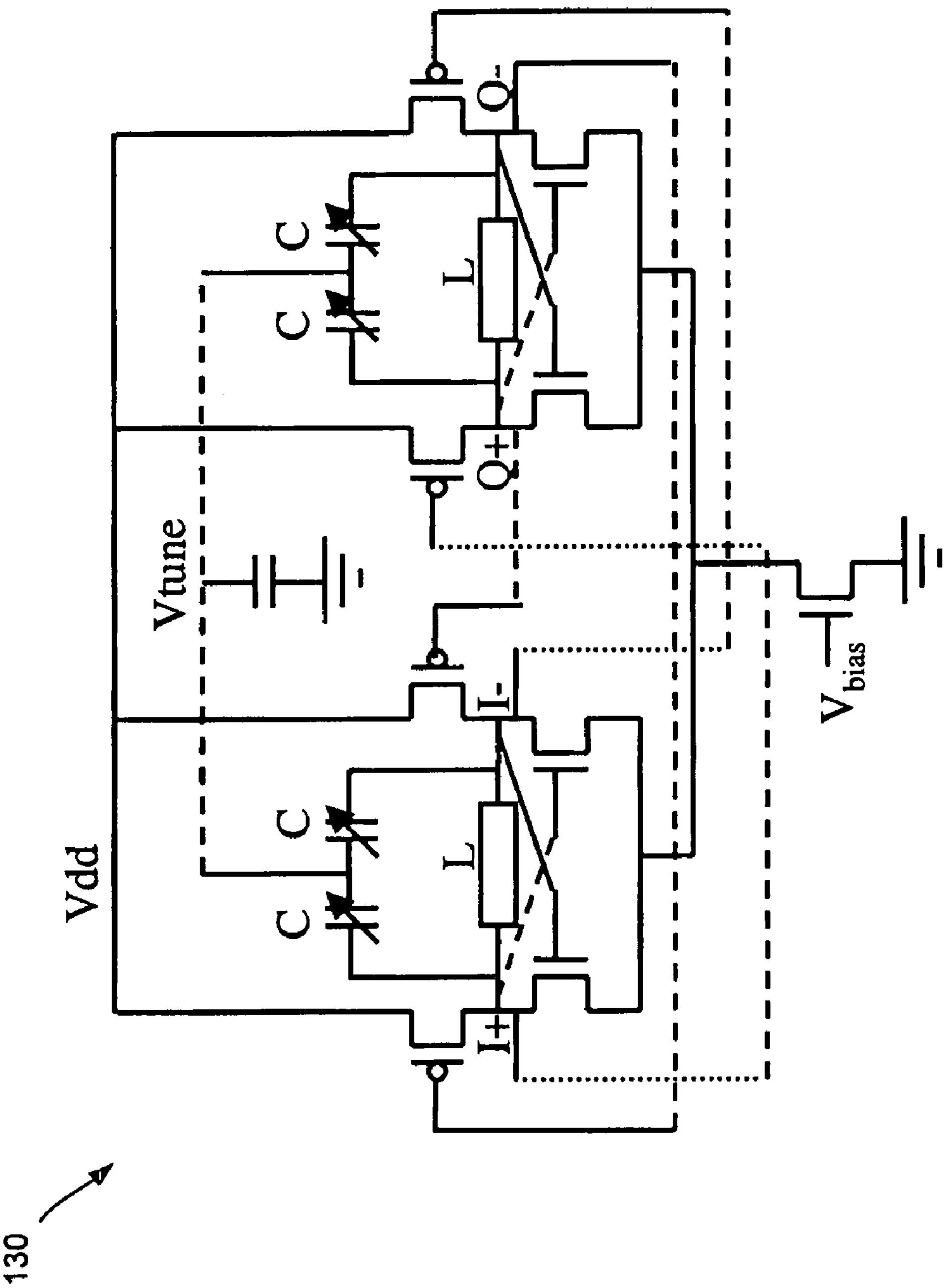
FIG. 4 illustrates a schematic of a quadrature oscillator, in accordance with an exemplary embodiment of the present invention.

As mentioned, the output of the QVCO 130 is coupled to the mixers 410 and 415. Preferably, the QVCO 130 is a quadrature signal generation block. FIG. 4 illustrates a schematic of the QVCO, in accordance with an exemplary embodiment of the present invention. The error voltage at the output 466 of the analog signal processor 200 provides the control voltage input to the QVCO 130. The control gain (frequency/voltage) of the QVCO is preferably rather high, in order to maximize the loop gain. As a result, a quadrature cross-coupled VCO with two cross-coupled cores is preferably implemented. Further, as illustrated in FIG. 4, an LC resonant network can determine the oscillation frequency. The variable capacitors can be implemented by MOS varactors. In order to reduce the high frequency noise components (4×LO) at the control input and enhance the locking performance, a small capacitor (e.g., approximately 150 fF) can be shorted to ground. FIG. 4 also depicts the schematic of the VCO core. Differential amplifier buffers are connected to the outputs to minimize the loading effect of the subsequent mixer on this VCO.

Figure 5:
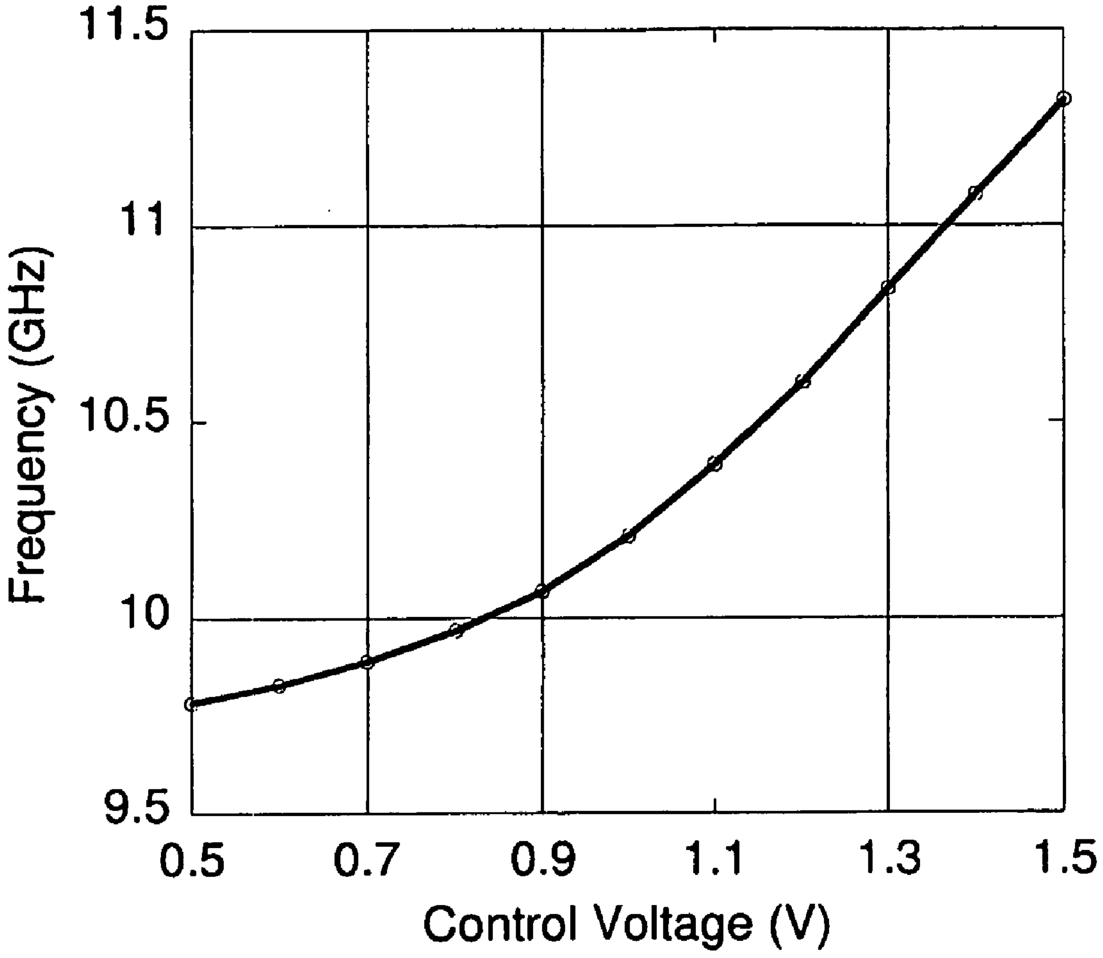
FIG. 5 illustrates a graphical representation of a simulated oscillation frequency for different control voltages, in accordance with an exemplary embodiment of the present invention.

FIG. 5 illustrates a graphical representation of a simulated oscillation frequency for different control voltages, in accordance with an exemplary embodiment of the present invention. Specifically, it depicts the simulated oscillation frequency with the control voltage input (Vtune). In a preferred embodiment, the nominal control voltage is approximately 1.14 V, and the strength of the differential signal at the LO input of the subsequent mixer is approximately 440 mV.

Referring back to FIG. 3, as described, the mixers 410 and 415 receive at least one signal from the QVCO 130. The signals ±I and ±Q are the outputs of mixers 410 and 415, and input into the first and second amplifiers dividers 425 and 430, respectively.

Each of the first and second amplifiers dividers 425 and 430 can include several amplifiers. In an exemplary embodiment, at least five (5) differential amplifiers are implemented, wherein each differential amplifier includes at least two inputs and at least two outputs.

For the first amplifier divider 425, which is shown in FIG. 3, the outputs 411 and 412 of the mixer 410 are coupled to the inputs of amplifier divider 425. Specifically, the outputs 411 and 412 are coupled to a first differential amplifier 505. The outputs 506 and 507 of the first differential amplifier 505 are coupled to two different differential amplifiers, namely a second differential amplifier 510 and a third differential amplifier 515. The output 506 of the first differential amplifier 505 is coupled to both the second and third differential amplifiers 510 and 515. Likewise, the output 507 of the first differential amplifier 505 is coupled to both the second and third differential amplifiers 510 and 515. The outputs 511 and 512 of the second differential amplifier are coupled to the fourth differential amplifier 525. The outputs 516 and 517 are coupled to both a fifth differential amplifier 530 and a differential-to-single-ended converter 535. The output 526 and 527 from the fourth differential amplifier 525 are coupled to the first multiplier 435. While the outputs 531 and 532 of the fifth differential amplifier 530 are coupled to the second multiplier 440. As for the output 536 of the differential-to-single-ended converter 535, it is I data.

In addition, a number of resistors 501 and capacitors 502 can be in parallel with the error amplifier 425 to provide DC compensation feedback to the amplifier divider 425.

As for the second amplifier divider 430 the outputs 416 and 417 of the mixer 415 are fed to the inputs of the amplifier divider 430. Specifically, the outputs 416 and 417 are fed into a first differential amplifier 555. The outputs 556 and 557 of the first differential amplifier 555 are fed two different differential amplifiers, namely second differential amplifier 560 and third differential amplifier 565. The output 556 of the first differential amplifier 555 is fed to both the second and third differential amplifiers 560 and 565. Likewise, the output 557 of the first differential amplifier 555 is fed to both the second and third differential amplifiers 560 and 565. The outputs 561 and 562 of the second differential amplifier 560 are fed to the fourth differential amplifier 570. The outputs 566 and 567 of the third differential amplifier 565 are fed to both a fifth differential amplifier 580 and a differential-to-single-ended converter 585. The output 576 and 577 from the fourth differential amplifier 570 are fed to the second multiplier 440. While the outputs 581 and 582 of the fifth differential amplifier 580 are fed to the first multiplier 435. As for the output 586 of the differential-to-single-ended converter 585, it is Q data.

In addition, a number of resistors 501 and capacitors 502 can be in parallel (electrically) with the differential amplifier divider 425 to provide DC compensation feedback to the amplifier divider 430.

In essence, the two amplifier dividers 425 and 430 connected to the two multipliers 435 and 440, respectively, generate a pair of differential outputs. The first differential output includes signals 436 and 437, while the second differential outputs includes signals 441 and 442. The difference between these two differential outputs is the resultant error signal because of unsynchronized QVCO 130 with the input signal 118. When the channels are perfectly synchronized, the crosstalk between I and Q is kept to a minimum and, hence, these outputs are the same, and the error is approximately zero. A goal of the amplifiers dividers 425 and 430, in conjunction with the analog multipliers 435 and 440, is to generate the error signal by multiplying I data with hard-limited Q data and vice-versa, and then taking the difference between the two. The practical implementation of the hard-limiter would be difficult in terms of the dynamic range of the inputs, as well as ideal behavior of the limiter.

Instead of limiting, a higher gain is provided in one path of the amplifier divider and a lower gain is provided in the other path. The higher gain path is connected to the LO input of the Gilbert-cell multipliers 435 and 440, and the lower gain path is connected to the RF input of the multipliers 435 and 440, so that the multiplier operates in the linear region (in terms of RF input) and the dynamic range of the system can be improved. The ratio of the gains between these paths is approximately 5:2. Preferably, the loop can provide at least approximately 10 dB dynamic range and an additional 10 dB dynamic range can be obtained from the IF VGA. The loading and biasing of the amplifiers are modified in order to realize the same delay (mismatch less than 1 ps) including the loading effect of the multiplier in both paths. In addition, the device sizes of the NMOS transistors in the differential pair are reduced in the divider stage to minimize the device capacitance at the dividing node.

Figure 7:
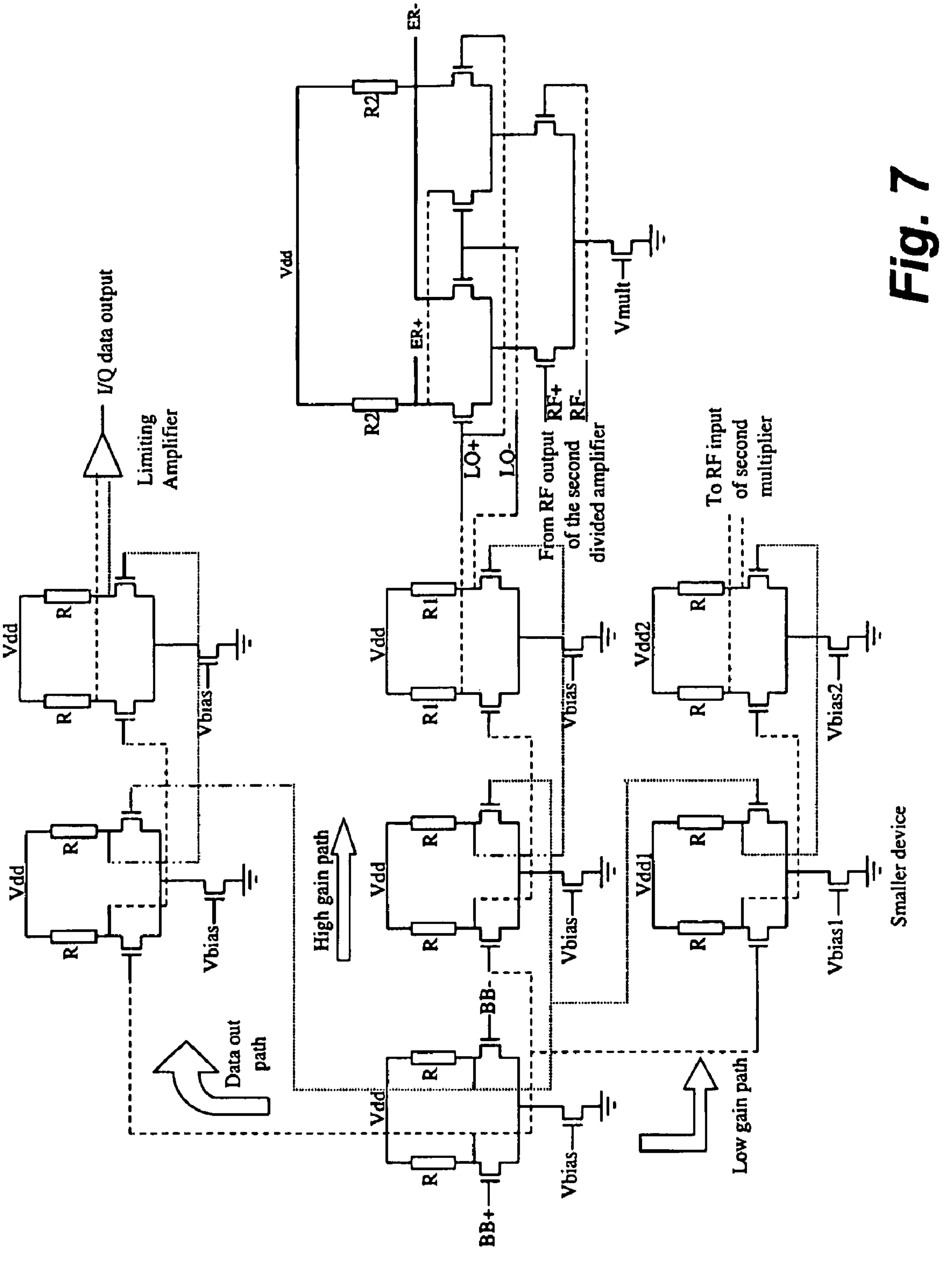
FIG. 7 illustrates a schematic of an amplifier divider, in accordance with an exemplary embodiment of the present invention.
Figure 8:
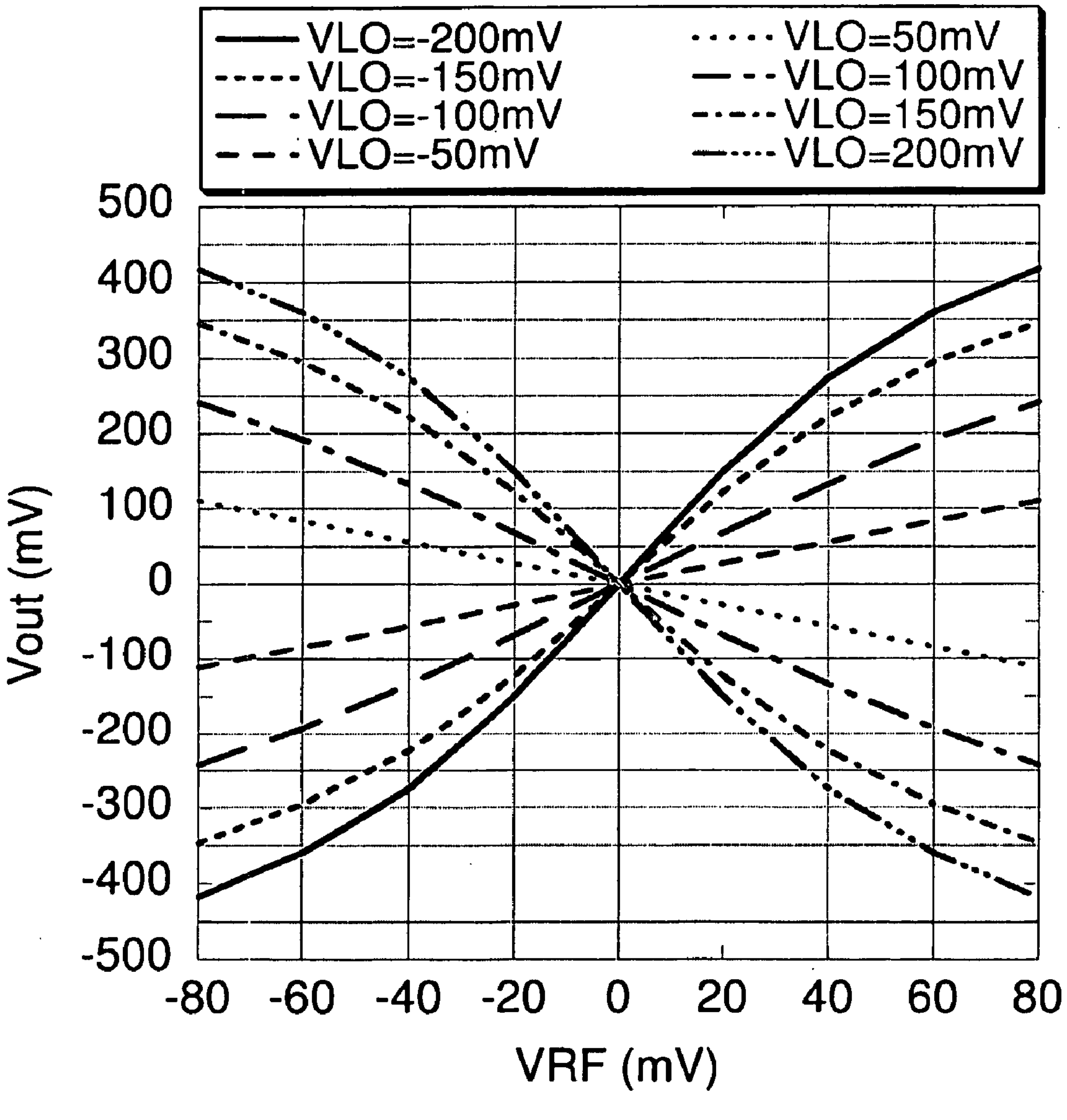
FIG. 8 illustrates an example graphical representation of analog multiplier output for different inputs, in accordance with an exemplary embodiment of the present invention.

FIG. 7 illustrates a schematic of an analog signal processor, in accordance with an exemplary embodiment of the present invention, while FIG. 8 illustrates a graphical representation of multipliers 435 and 440 for different inputs, in accordance with an exemplary embodiment of the present invention.

Preferably, the delay offset between the RF and the LO outputs are less than 400 fs. Notably, the delay in the both of the paths is approximately 35 ps. The stages are DC-coupled and hence a passive RC DC offset compensation scheme 501 and 502 is implemented using off-chip capacitors (approximately 1 μF capacitor is preferred) for each of the high-gain divided amplifier chain as shown in FIG. 3. The data (both I and Q) are tapped from specified points inside the chain and fed to two limiting amplifiers. The final output is compatible with the input of FPGA-based serial transceivers (±300 mV).

Figure 11:
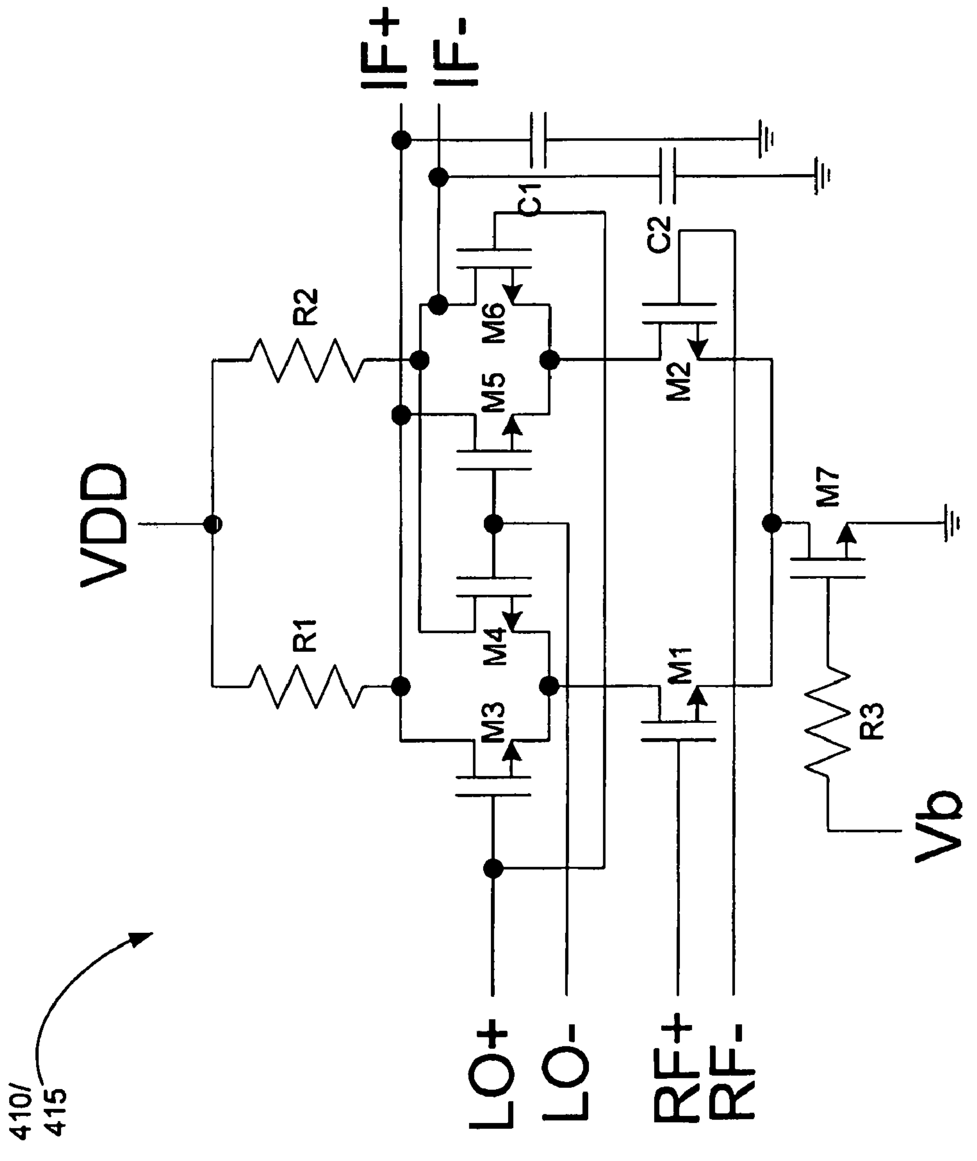
FIG. 11 illustrates a schematic of an analog multiplier mixer, in accordance with an exemplary embodiment of the present invention.

The double-balanced Gilbert-cell core can be used as the multiplier as shown in FIG. 11 (the loading is resistive instead of parallel RC load). FIG. 8 shows the output of the multiplier for different RF and LO inputs, which are coupled to the divided amplifier stage. As mentioned, the range is shown from the practical considerations as the gain of the LO path is approximately 2.5 times higher than that of the RF path.

Referring now to FIG. 8, the multiplier output is approximately linear with the RF input voltage (the output tends to saturate at higher values of RF voltage). It is preferably more non-linear with the LO input voltage. This non-linearity also depends on the amplitude of RF voltage. Additional non-linearity eliminates the need of the limiter block 340 (see FIG. 2). In addition, the higher gain in the LO path and the lower gain of the RF path helps to increase the dynamic range of the overall loop. The bandwidth of the multiplier is much higher than that of the data bandwidth (3.5 GHz).

Referring back to FIG. 3, as noted above, the signals of the system 400 are transmitted at the first and second multipliers 435 and 440. The first and second multipliers 435 and 440 produce two outputs 436 and 437, and 441 and 442, respectively. The outputs 436 and 437 of first multiplier 435 are fed to the first differential-to-single-ended converter 445, and the outputs 441 and 442 of the second multiplier 440 are fed to the second differential-to-single-ended converter 450.

The differential-to-single-ended converters 445 and 450 are preferably a PMOS load in current mirror connection, and can be used as the load of the differential amplifier to convert the differential error signal in each I and Q path into single-ended signal. As a result, a differential amplifier can be fed with those signals to amplify and generate the resultant error signal.

The outputs 446 and 451 of the differential-to-single-ended converters 445 and 450, respectively, are coupled to a high gain amplifier 455.

Preferably, the high gain amplifier 455 comprises four cascaded differential amplifiers 456, 457, 458 and 459. Specifically, four differential amplifiers 456-459, followed by a differential-to-single-ended converter 461, are used to provide enough gain to lock the loop. Differential NMOS amplifiers with resistive loads are used to realize one single gain stage. A passive RC DC offset 449 compensation loop can be used to nullify the effect of common-mode DC offset in this high gain differential amplifier. The output 462 of the differential-to-single-ended converter 461 of the high gain amplifier 455 is a single-ended error signal and is coupled to the low pass filter 460.

The low pass filter 460 is a pole-zero low-pass filter and the location of the pole and the zero is determinant in terms of the loop lock range. When the pole and zero are far apart, significant more gain is required. The noise in the error signal, however, is reduced.

The output of the low pass filter 460 is coupled to the common emitter buffer 465. This common-emitter stage can ensure that there is minimal loading of the loop filter on the control voltage input of the QVCO and vice-versa. In addition, it acts as a DC level-shifter to set the bias point suitable for QVCO operation over a very wide range of IF carrier frequency.

The output 466 of the common emitter buffer 465 is fed back to the QVCO 130, completing the loop.

Preferably, when the schematic of FIG. 3 is laid out in a 90 nm CMOS process, the design can occupy an area of about approximately 1 $mm^2$, or less, excluding bonding pads.

Analog Signal Processor With Capacitors

Figure 9:
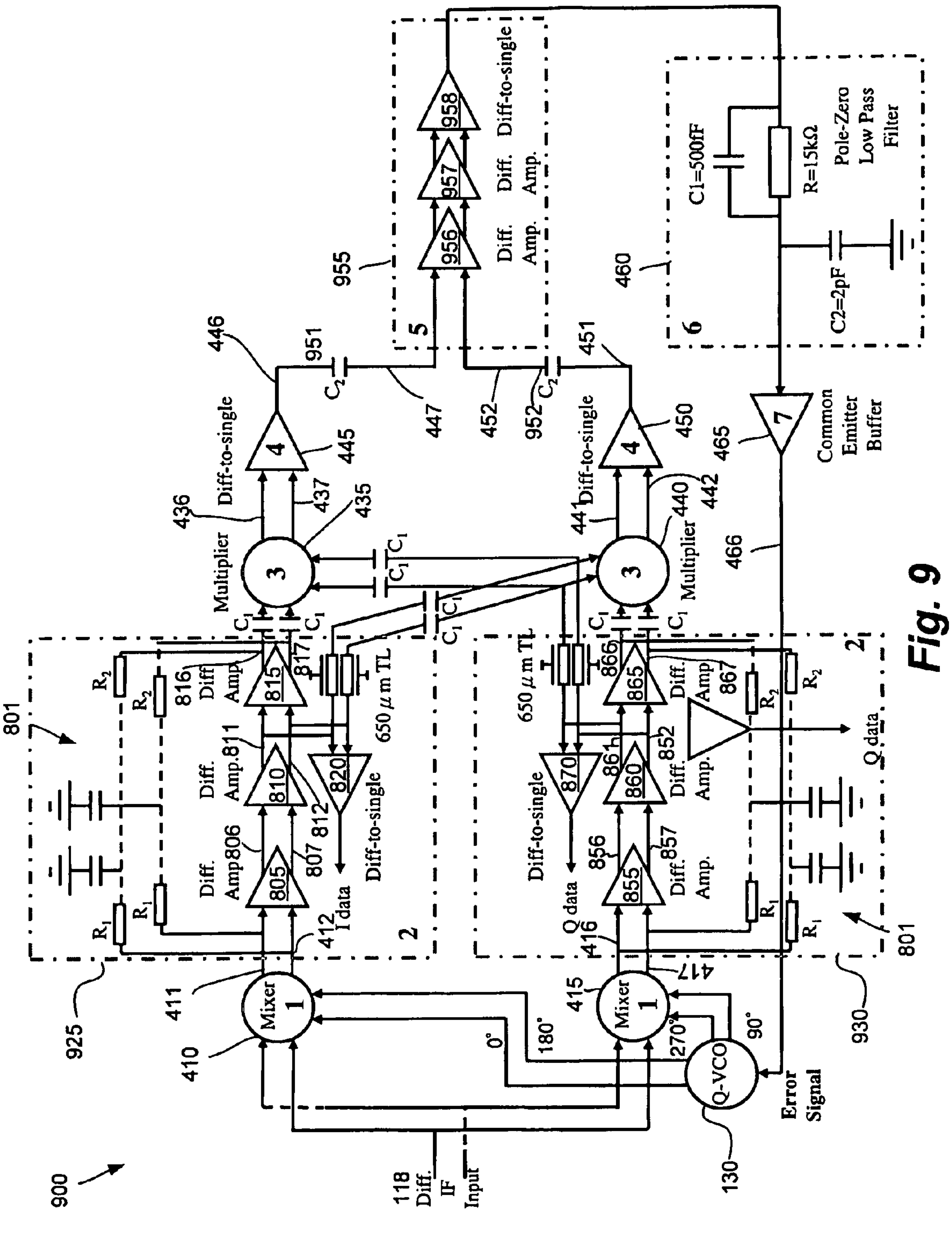
FIG. 9 illustrates a schematic of another analog signal processor, in accordance with an exemplary embodiment of the present invention.

In another embodiment of the present invention, as illustrated in FIG. 9, an analog signal processor can be used to synchronize a local oscillator to an IF signal in a CMOS multi-Gigabit receiver. Inputs to the analog signal processor are the QPSK modulated IF (approximately 7 GHz to approximately 14 GHz) signal. The correct demodulation of baseband I and Q signals can be maintained by the phase-locking of the QVCO outputs to the input signal. The system can accommodate a raw speed of approximately 7 Gbps with QPSK, and approximately 14 Gbps with 16 quadrature amplitude modulation if a signal-to-noise ratio (SNR) is larger than approximately 16 dB in the receiver. This design has an improved performance in terms of smaller size, lower power consumption (approximately 220 mW), and enhanced robustness over the IC fabrication variation.

The schematic of FIG. 9 is similar to the schematic of FIG. 3. One distinction between the two figures is in the design of the amplifier dividers. The system 900 as depicted in FIG. 9 is more robust than the system 400 as depicted in FIG. 3, because each amplifier divider in the system 900 of FIG. 9 requires less cascaded differential amplifiers.

Specifically, a beneficial feature of the system 900 is its robustness against IC fabrication variation. To prevent the DC offset at the system level, DC-blocking capacitors such as $C_1$ and $C_2$ are inserted between function blocks. The capacitors $C_1$ can be on-chip capacitors, and can have a preferred minimum value of approximately 10 pF. Specifically, the capacitors $C_1$ are preferably Metal-Insulator-Metal (MIM) capacitors, which are available in the 90 nm CMOS design kit. On the other hand, capacitors $C_2$ are off-chip 10 nF thin-film capacitors. Also, at the inputs of the multipliers 435 and 440, a continuous spectrum of direct current approximately 3.5 GHz constitutes the signal, and the 10 pF on-chip capacitors ($C_1$) pass a majority of its content. At the output of the multipliers 435 and 440, the emphasis is on the low-frequency component that results from the multiplication. Hence, larger capacitors (available off-chip) may be required to retain the desired frequency (below 1 GHz) content without considerable attenuation.

FIG. 9 illustrates a schematic of an analog signal processor system 900, in accordance with an exemplary embodiment of the present invention. The analog signal processor system 900 can be provided the IF 118, and comprises first and second mixers 410 and 415, the quadrature voltage controlled oscillator (QVCO) 130, a first amplifier divider 925, a second amplifier divider 930, multipliers 435 and 440, differential-to-single-ended converters 445 and 450, a high gain amplifier 955, a low pass filter 460, and a common emitter buffer 465.

The analog signal processor 900 receives the IF 118. Specifically, the IF 118 is fed into both the first and second mixers 410 and 415. Preferably, the IF 118 is a differential intermediate frequency input.

Figure 10:
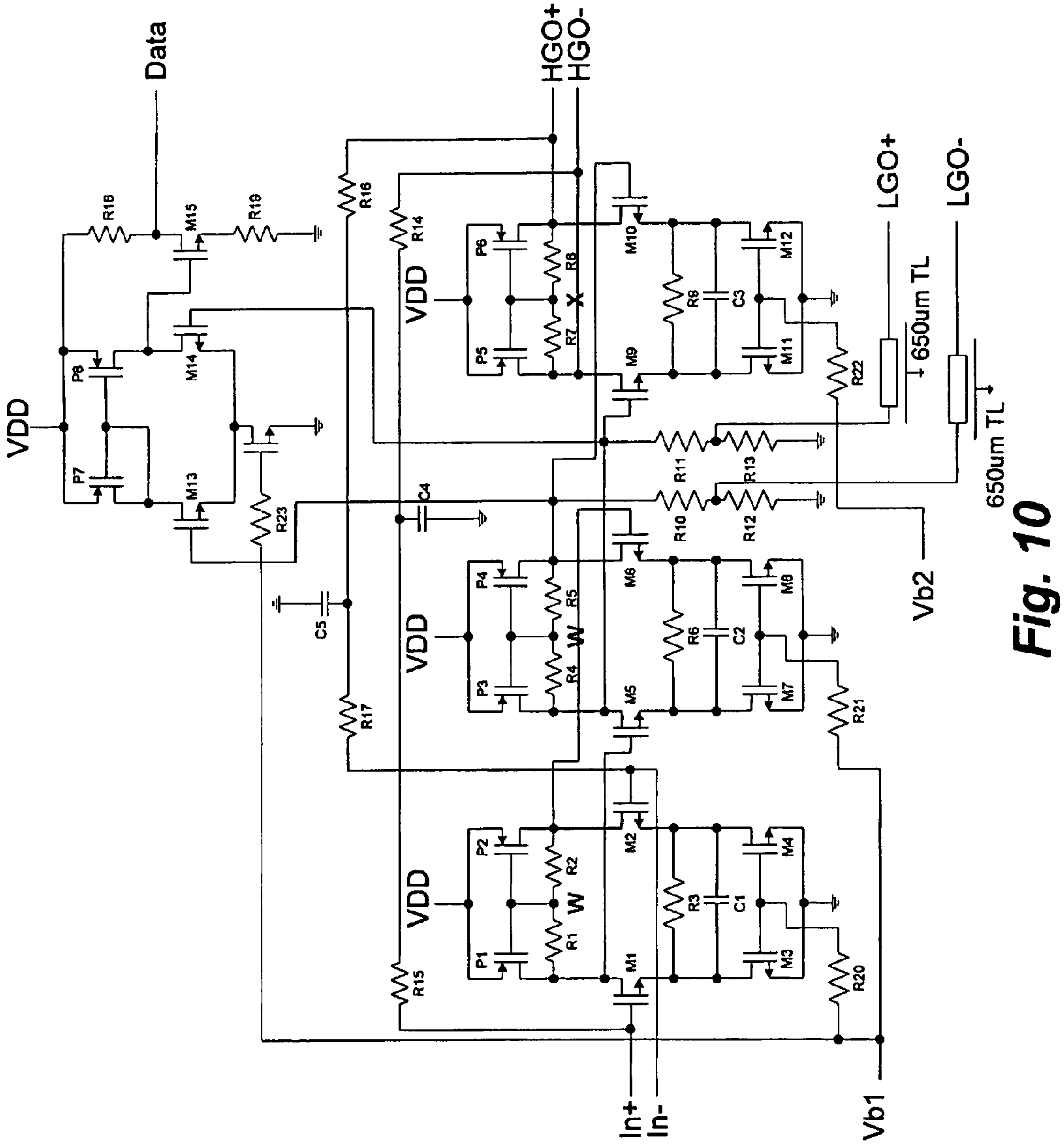
FIG. 10 illustrates a schematic of an analog signal divider, in accordance with an exemplary embodiment of the present invention.

A preferred schematic for the amplifiers dividers 925 and 930 is depicted in FIG. 10. The amplifier divider can split its input into two paths and provide different amplification (ratio of at least 5:2) to each of them (HGO± and LGO±). The amplifier divider also maintains the delay difference of less than 1 ps between them at the inputs of the multipliers.

Still referring to FIG. 10, instead of loading resistors in the original amplifier dividers (425 and 430), PMOSs (P1, P2, P3, P4, P5, and P6) with resistors (R1, R2, R4, R5, R7, and R8) can be used to minimize potential resistor mismatch. A common-mode voltage appears at node W and node X in the differential signal path. The two PMOSs that are biased by this voltage act as the new loads. With this configuration, the performance of the signal divider is not affected when there is at least 10% resistor mismatch.

Further, degenerative differential amplifiers with resistors (R3, R6, and R9) and capacitors (C1, C2, and C3) provide a broadband frequency response. This effect is two fold. Because the PMOS-load amplifier has a lower bandwidth, the degeneration method extends the overall bandwidth. Also, the gain reduction by the degeneration is desirable as the potential stability issue arises with more than two cascaded amplifiers.

Another beneficial feature of the amplifier divider is the method to achieve the gain difference for the two outputs with a similar delay by utilizing the inherent interconnection between function blocks in the layout. The high-gain path (with output HGO±) has an additional gain stage in comparison to the low-gain path (with output LGO±). The added delay of the high-gain signal path (due to the third amplifier) is compensated by the resistor bridge (R10, R11, R12, and R13) and the 4 μm wide, 650 μm long transmission line at the output of the low-gain output. The gain difference of approximately 9 dB (approximately a factor of 2.9) for the signal divider is achieved using the third amplifier stage. Hence, less degeneration (smaller R9 and C3) and higher DC bias current are employed in the last stage amplifier. High values of the resistors R10, R11, R12, and R13 can be used to reduce the loading of the transmission lines in the second amplifier stage.

A simple DC compensation scheme with R14, R15, R16, and R17, C4 and C5 are in place for more robustness against the DC offset between amplifier stages. With capacitors $C_1$ (see FIG. 9) connected to both HGO± and LGO±, the potential DC offset effect arising from the amplifier divider will not affect the multipliers. The modified amplifier divider can tolerate a resistor mismatch (R1 and R2 in FIG. 11) up to 10% in the preceding mixer circuit.

Referring back to FIG. 9, the outputs 411 and 412 from the mixers 410 and the outputs 416 and 417 from the mixer 415 are coupled to the first and second amplifiers divider 925 and 930, respectively. (See FIG. 11 for an exemplary schematic of mixers 410 and 415.)

The first amplifier divider 925 includes preferably three differential amplifiers. The outputs 411 and 412 of mixer 410 are coupled to a first differential amplifier 805. The first differential amplifier 805 generates two outputs 806 and 807. The outputs 806 and 807 are coupled to a second differential amplifier 810. The second differential amplifier 810 also generates two outputs 811 and 812. The outputs 811 and 812 can be coupled to a third differential amplifier 815 and a differential-to-single-ended converter 820. The third differential amplifier 815 generates two outputs 816 and 817. The differential-to-single-ended converter 820 generates a single output—I data. The outputs 811 and 812 are also connected to a resistor bridge (R10, R11, R12, and R13 in FIG. 10) and the resistor bridge is connected to a 650 μm Transmission line (TL). Capacitors $C_1$ are positioned between the second multiplier 440 and the TL. The outputs 816 and 817 of the third differential amplifier 815 are each coupled to capacitors $C_1$, which are also coupled to the first multiplier 435. An RC DC offset compensation scheme 801 can be in parallel with the differential amplifiers 805, 810, and 815.

Likewise, the second amplifier divider 930 includes preferably three differential amplifiers. The outputs 416 and 417 of the mixer 415 are coupled to a first differential amplifier 855. The first differential amplifier 855 generates two outputs 856 and 857. The outputs 856 and 857 are coupled to a second differential amplifier 860. The second differential amplifier 860 also generates two outputs 861 and 862. The outputs 861 and 862 are coupled to a third differential amplifier 865 and a differential-to-single-ended converter 870. The third differential amplifier 865 generates two outputs 866 and 867. The differential-to-single-ended converter 870 generates a single output—Q data. The outputs 861 and 852 are also connected to a resistor bridge (similar to R10, R11, R12, R13 in FIG. 10) and the resistor bridge is connected to a 650 μm Transmission line (TL). Capacitors $C_1$ are positioned between the first multiplier 435 and the TL. The outputs 866 and 867 of the third differential amplifier 865 are each coupled to capacitors $C_1$, which are also coupled to the second multiplier 440. The RC DC offset compensation scheme 801 can be in parallel with the differential amplifiers 805, 810, and 815.

The outputs 436 and 437 of the first multiplier 435 are coupled to a differential-to-single-ended converter 445. The result is a single output 446. The output 446 is fed through a capacitor $C_2$ 951 to create signal 447.

The outputs 441 and 442 of the second multiplier 440 are coupled to a differential-to-single-ended converter 450. The result is a single output 451. The output 451 is fed through a capacitor $C_2$ 952 to create signal 452.

Figure 12:
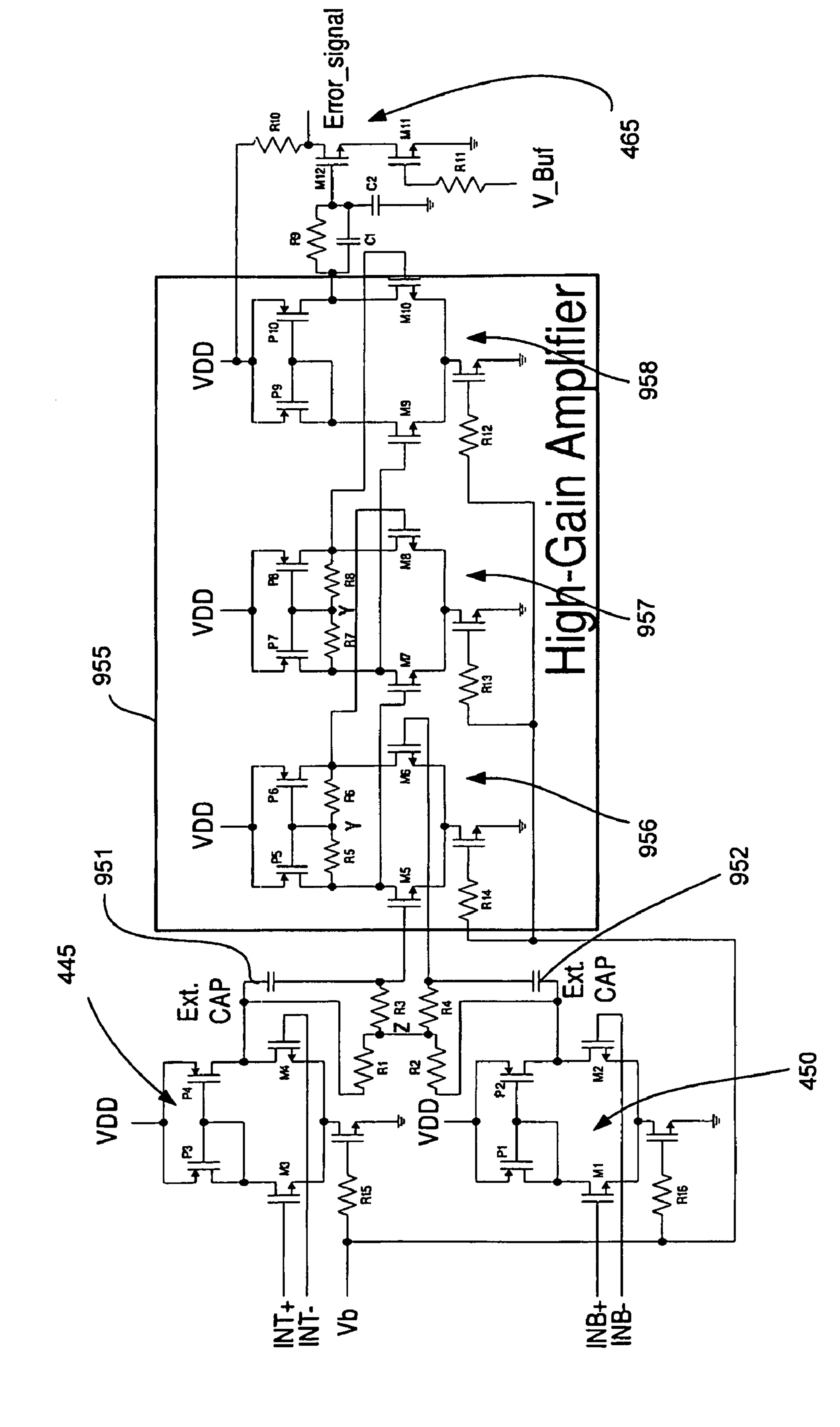
FIG. 12 illustrates a schematic of an exemplary error amplifier, including a differential-to-single-ended converter, a high gain amplifier, a loop filter, and a buffer, in accordance with an exemplary embodiment of the present invention.

The signals 447 and 452 are coupled to the high gain amplifier 955. FIG. 12 illustrates a schematic of a differential-to-single-ended converter, a high gain amplifier, a loop filter, and a buffer, in accordance with an exemplary embodiment of the present invention.

The high-gain amplifier 455 in system 300 comprises preferably four cascaded amplifier stages (see FIG. 3). Referring to FIG. 9 and thus system 900, the high gain amplifier 955 comprises two differential amplifier stages 956 and 957 followed by a differential-to-single-ended converter 958 (also shown in FIG. 12) to provide the loop gain in the analog signal processor. Preferably, only two differential amplifiers are implemented, because of stability concerns. The similar PMOS-load configuration (in which the common-mode voltage appears at node Y of FIG. 12) is employed in the individual amplifier stage for an improved robustness against the DC offset. The degeneration method is not used in the high-gain amplifier since the required bandwidth of the high-gain amplifier is lower (below 1 GHz).

As shown in FIG. 12, biasing of the first amplifier stage in the high-again amplifier 955 is performed using large resistors R1, R2, R3, and R4 in the differential to single ended converters. Outputs of the two differential-to-single-ended converters 445 and 450 are AC-coupled into the high-gain amplifier 955 through the two off-chip thin-film capacitors $C_2$ 951 and 952. Preferably, the outputs of the two converters 445 and 450 have the same DC voltage, if both I and Q paths are perfectly symmetrical, i.e., without any DC offset. Although they could be different, their average would appear at node Z (see FIG. 12), and it is used to bias the first stage of the high-gain amplifier 955. Resistors, R1, R2, R3, and R4 are large-enough (e.g., in the kΩ range) that most of the AC signal is blocked. This reduces the number of external bias point.

The single output of the high gain amplifier 955 is fed to the low pass filter 460. The output of the low pass filter is fed to the common emitter buffer 465. Then output 466 of the common emitter buffer is coupled to the QVCO 130, and thus completes the loop of system 900.

In a preferred embodiment, the layout of the system 900 is implemented with an analog signal processor along with the quadrature voltage-controlled oscillator in the STMicroelectronic's 90 nm CMOS process. The overall power consumption is approximately 220 mW from a single 1.8V supply, which is approximately 20% lower than that of the analog signal processor system 300.

Analog Signal Processors for BPSK/ASK MSK/ASK Systems

Figure 13:
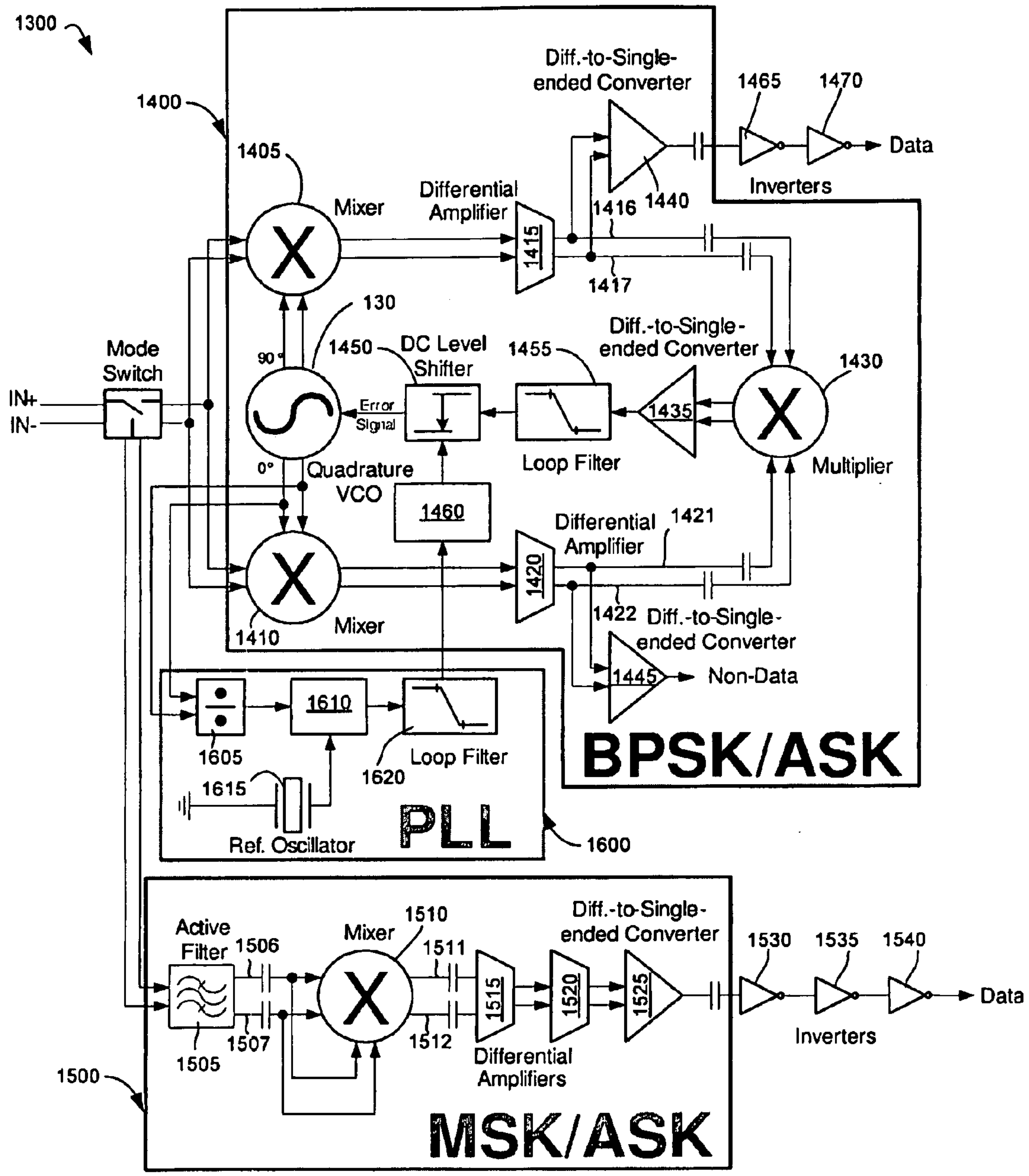
FIG. 13 illustrates a schematic of a tri-mode analog signal processor for BPSK/ASK/MSK operation, in accordance with an exemplary embodiment of the present invention.

In yet another embodiment of the present invention, as illustrated in FIG. 13, a low-power tri-mode solution is implemented to demodulate the incoming multi-gigabit binary phase shift keying (BPSK), minimum shift keying (MSK), and/or amplitude shift keying (ASK) signal.

When working in a coherent BPSK/ASK mode, the analog signal processor can be adapted to synchronize a local oscillator to the IF signal in a CMOS multi-gigabit receiver. For instance, a modulated signal at IF (approximately 5 GHz-12 GHz) is down-converted to baseband data signal through the phase-locking of the quadrature voltage-controlled oscillator (QVCO) outputs to the input signal. On the other hand, when working in the non-coherent MSK/ASK mode, the analog signal processor can directly detect the incoming modulated IF signal, and recover the original baseband digital signal.

Moreover, the analog signal processor can accommodate a raw speed of approximately 3.5 Gbps (with a wide locking range: ±100 MHz) for coherent BPSK/ASK operation, and 2 Gbps for non-coherent MSK/ASK operation. The analog signal processor design have a rather low-power consumption, e.g., approximately 70 mW for coherent BPSK/ASK operation and approximately 34 mW for non-coherent MSK/ASK operation.

Further, the overall size of the tri-mode ASP is relatively compact (e.g., approximately 0.98 mm by approximately 1.08 mm). A phase-lock loop (PLL) can be provided to improve the robustness of the coherent analog signal processor operation against process variations during the IC fabrication. For the coexistence of the PLL and the coherent operation of the tri-mode analog signal processor, a special memory cell can be provided as necessary to prevent the PLL and the analog signal processor from working simultaneously.

Notably, as illustrated in FIG. 13, the tri-mode analog signal processor is capable of both coherent BPSK/ASK and non-coherent MSK/ASK operations. After the first down-conversion of the millimeter-wave front-end, input to the analog signal processor is a BPSK, MSK or ASK modulated signal at the IF, e.g., between approximately 5 GHz and approximately 12 GHz. An error signal is generated from this mode of operation and it continuously varies the phase of the QVCO to track the input signal hence maintains the correct demodulation of the baseband data signal. For the non-coherent MSK/ASK operations, the ASP mixes the modulated IF signal with itself to detect the baseband data waveform.

The system 1300 as shown in FIG. 13 comprises at least three parts: the coherent BPSK/ASK system 1400 (or a QPSK system as illustrated in FIGS. 3 and 9), the non-coherent MSK/ASK system 1500, and the PLL 1600.

The coherent BPSK/ASK system 1400 preferably can comprise IF mixers 1405 and 1410; differential amplifiers 1415 and 1420; a multiplier 1430; differential-to-single-ended converters 1435, 1440, and 1445; a DC Level Shifter 1450; a loop filter 1455; a memory cell circuit 1460; and inverters 1465 add 1470.

The non-coherent MSK/ASK system 1500 preferably can comprise an active filter 1505; an IF mixer 1510; differential amplifiers 1515 and 1520; a differential-to-single-ended converter 1525; and inverters 1530, 1535, and 1540.

The PLL 1600 is used to enhance the robustness of the coherent operation. The PLL preferably comprises a divider 1605; a phase-frequency detector (PFD) 1610; a reference frequency oscillator 1615; and a loop filter 1620.

In the coherent BPSK/ASK system 1400 operation, after the down-conversion by the IF mixers 1405 and 1410, the signals are DC-coupled with the differential amplifiers 1415 and 1420, respectively. The differential amplifiers 1415 and 1420 are implemented to increase the overall loop gain in the loop, as well as provide a large voltage swing to trigger the inverters 1465 and 1470. In order to reduce the DC offset effect, the outputs of the differential amplifiers are AC-coupled with the multiplier. Specifically, the outputs 1416 and 1417 of the differential amplifier 1415 are AC coupled to the multiplier 1430, and the outputs 1421 and 1422 of the differential amplifier 1420 are also AC coupled to the multiplier 1430.

The differential-to-single-ended converters along with the DC level shifter 1455 provide additional gain in the loop path. When the analog signal processor is in a phase-locking condition with the incoming BPSK signal, the recovered data signal is in the top path and a noise-like waveform appears in the bottom path. Both outputs can display similar unrecognizable waveforms if the analog signal processor can not lock onto the incoming IF signal.

With the non-coherent MSK/ASK system 1500 in operation, the IF signal 118 is filtered through the active bandpass filter 1505 that can provide additional gain. The filtered signals 1506 and 1507 are then mixed with itself via the mixer 1510 to recover the baseband data signal. Capacitors can be coupled to the filtered signal of the active filter 1505 and the mixer 1510. The outputs of the mixer 1511 and 1512 are coupled to two cascaded differential amplifiers 1515 and 1520. The second of the two cascaded differential amplifiers 1520 is coupled to the differential-to-signal converter 1525, which is implemented to boost a weak detected signal in order to properly trigger the AC-coupled inverters 1530, 1535, and 1540.

Figure 14:
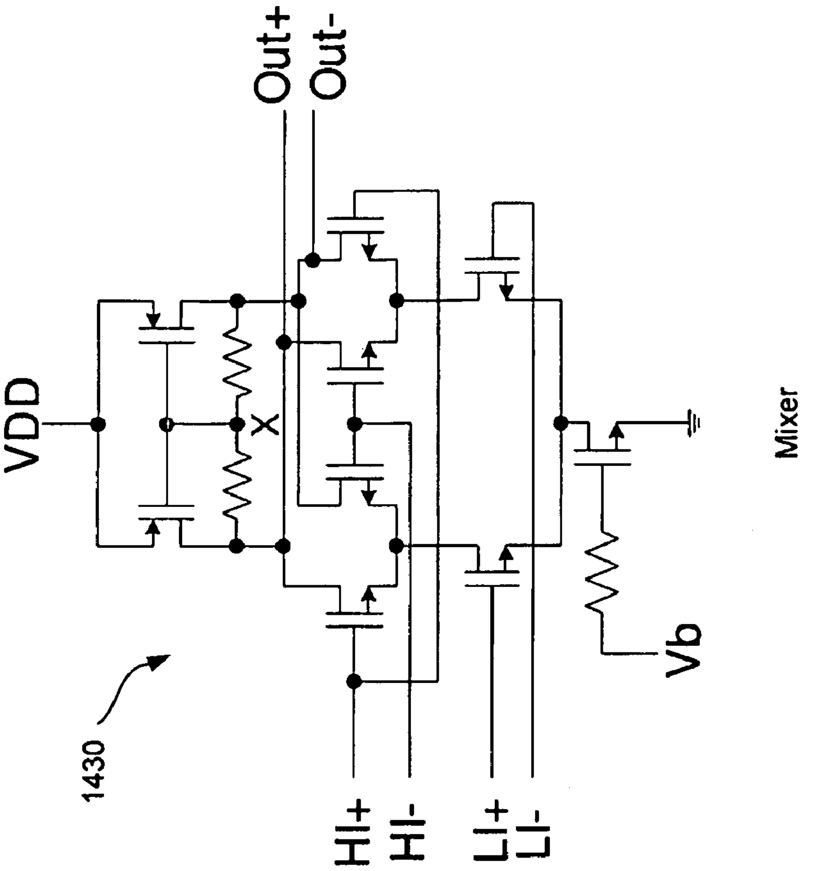
FIG. 14 illustrates a schematic of another multiplier, in accordance with an exemplary embodiment of the present invention.

Preferably, the Gilbert-cell architecture can be used for the design of IF mixers 1405, 1410, and 1510. A schematic of the mixer is depicted in FIG. 11, and a schematic of the multiplier 1430 is depicted in FIG. 14. In essence, the same mixer design can be used in both the coherent system 1400 and non-coherent system 1500. In comparison to the resistor loading at the differential outputs of the mixer (see FIG. 11), PMOS loading with resistors are implemented in the multiplier to minimize the DC offset effect (see FIG. 14). At node X of FIG. 14, there is a single common-mode voltage, which can bias the two PMOS transistors.

Figure 15:
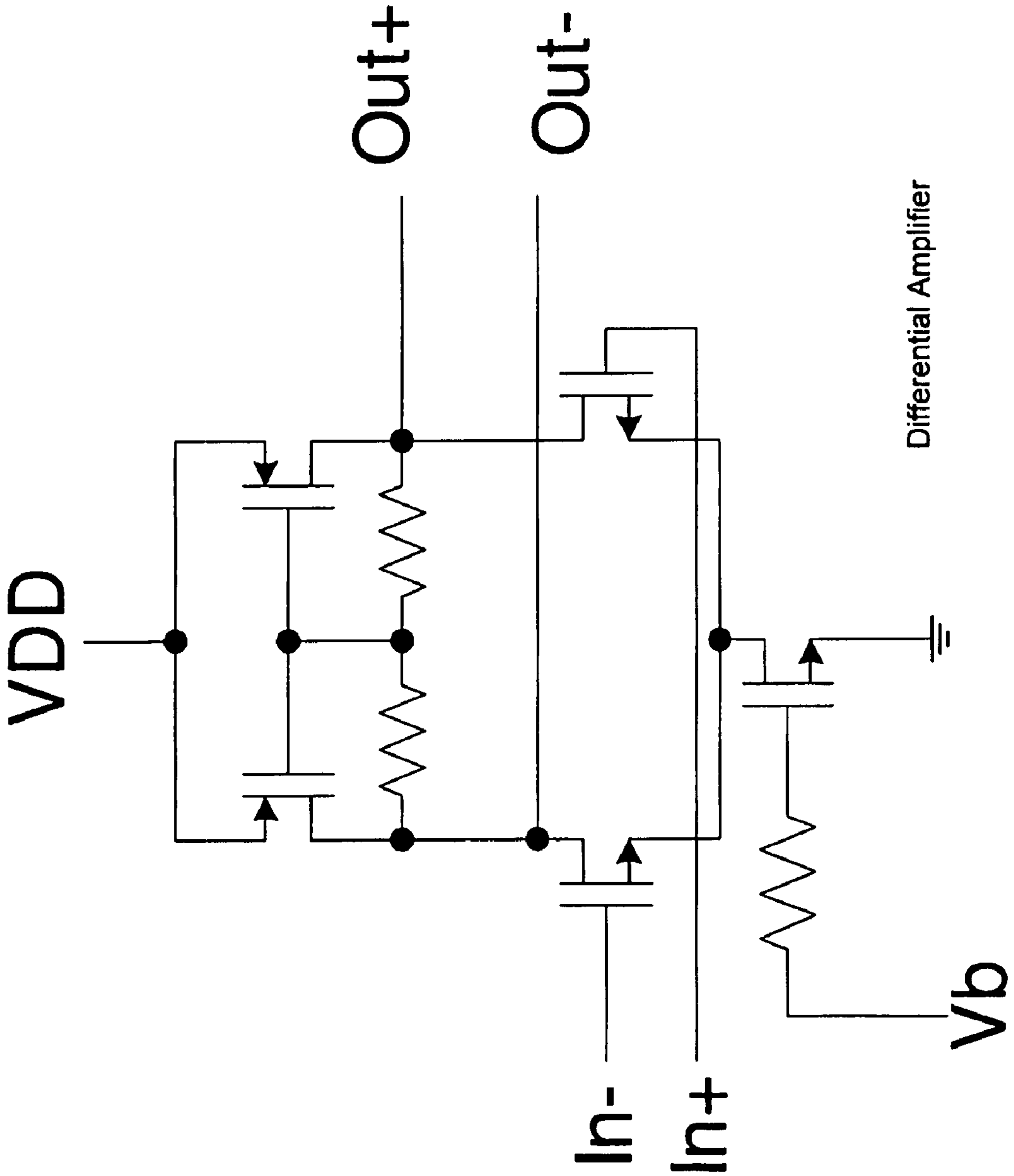
FIG. 15 illustrates a schematic of a differential amplifier, in accordance with an exemplary embodiment of the present invention.

Preferably, the differential amplifiers 1415 and 1420 of the coherent BPSK/ASK system 1400 and the differential amplifiers 1515 and 1520 of the non-coherent system 1500 are similar. A schematic of the differential amplifier is depicted in FIG. 15. For the coherent system 1400, the differential amplifiers 1415 and 1455 can provide an additional 12 dB gain in the overall loop gain without a significant reduction of the data bandwidth. A similar PMOS loading with resistors is used for the same reason as mentioned in the multiplier 1430. This same principle is applied to the two cascaded differential amplifiers 1515 and 1520 that are used in the non-coherent system 1500.

Figure 16:
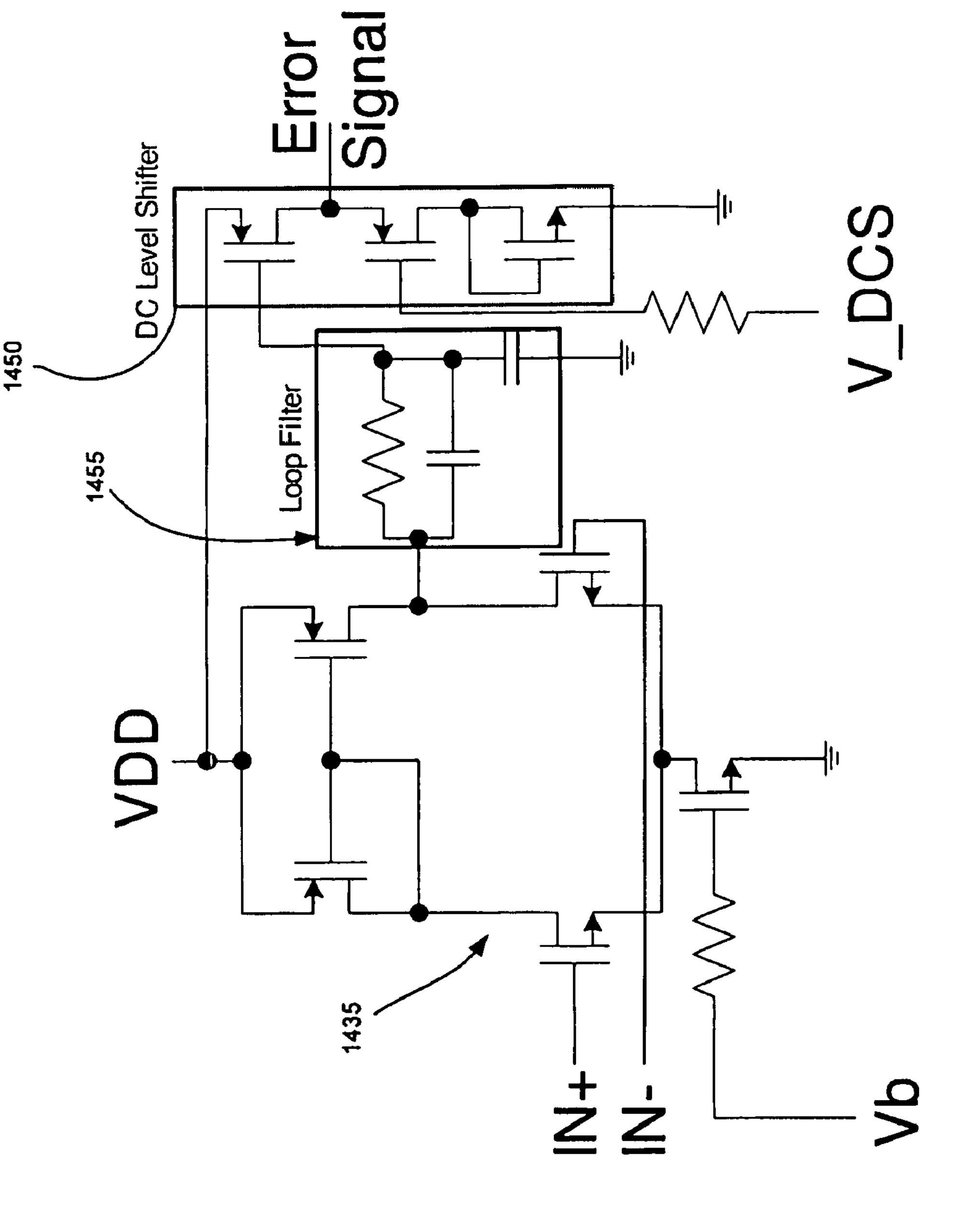
FIG. 16 illustrates a schematic of a differential-to-single-ended converter, a loop filter, and a DC level shifter, in accordance with an exemplary embodiment of the present invention.

A schematic for the differential-to-single-ended converter, the loop filter, and the DC level shifter is depicted in FIG. 16. The differential-to-single-ended converter 1435 amplifies the output of the multiplier 1430 in the coherent system 1400. The loop filter 1455 is a pole-zero, low-pass filter. Its pole and the zero are chosen for a desired locking range and a practical on-chip implementation. The DC level shifter 1450 provides little gain, but it moves the DC component of the error signal to be in the linear region of the QVCO tuning curve. Overall, the differential-to-single-ended converter 1435 and the DC level shifter 1450 can provide another 12 dB gain in the loop. The bias voltage, V_DCS, of the DC level shifter 1450 can provide an external control in case of a frequency shift of the QVCO 130 during the IC fabrication. This is also the control voltage that the PLL 1600 uses to set the oscillation frequency of the QVCO.

Figure 17:
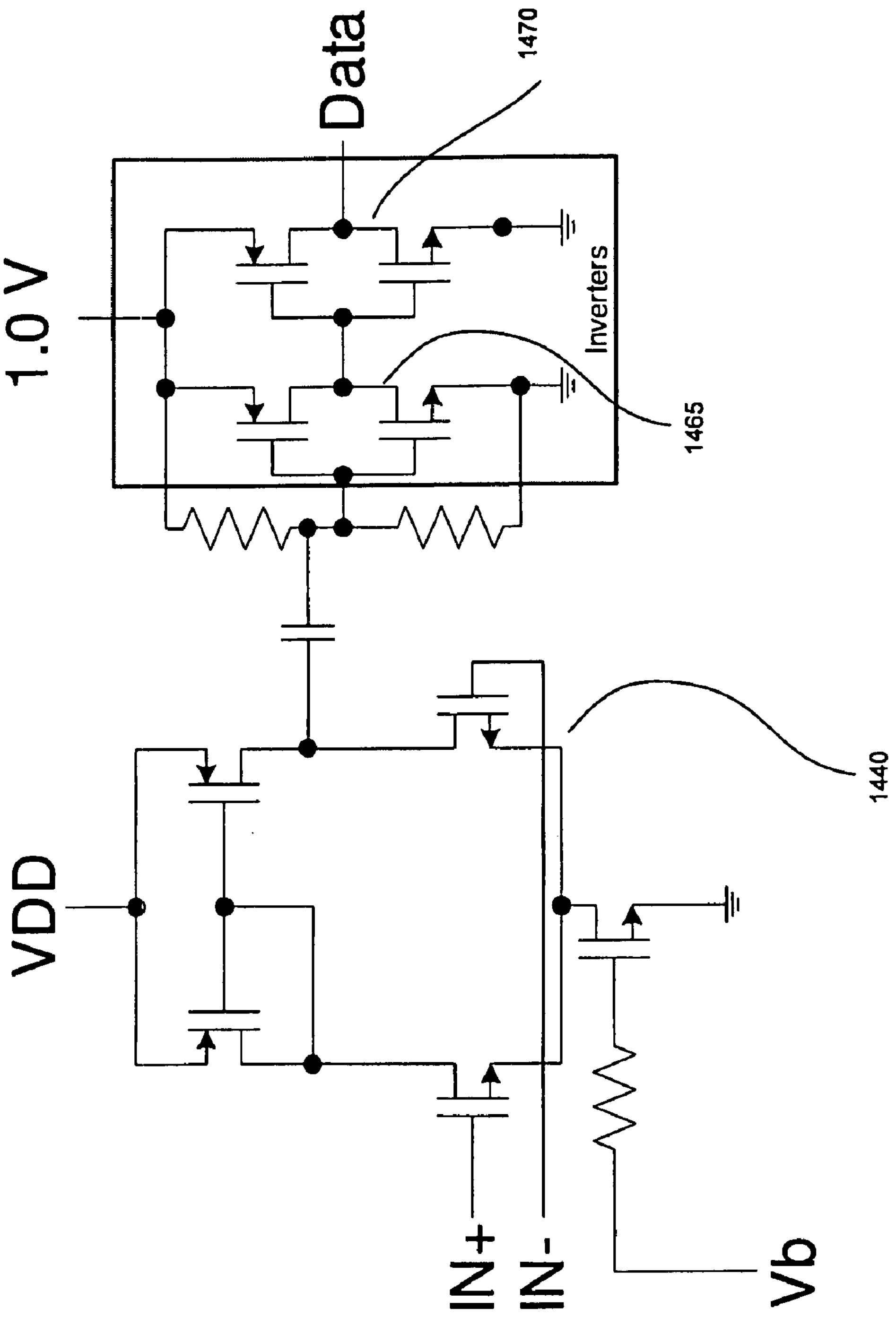
FIG. 17 illustrates a schematic of a differential-to-single-ended converter and an inverter system, in accordance with an exemplary embodiment of the present invention.

The final data output is single-ended with two or three inverters (see FIG. 17) acting as buffer to external (potentially digital) circuitries. The two inverters 1465 and 1470 of the coherent BPSK/ASK system 1400, and three inverters 1530, 1535, and 1540 of the non-coherent MSK/ASK system 1500 can ensure that a demodulated analog data waveform is compatible to standard digital signal.

Figure 18:
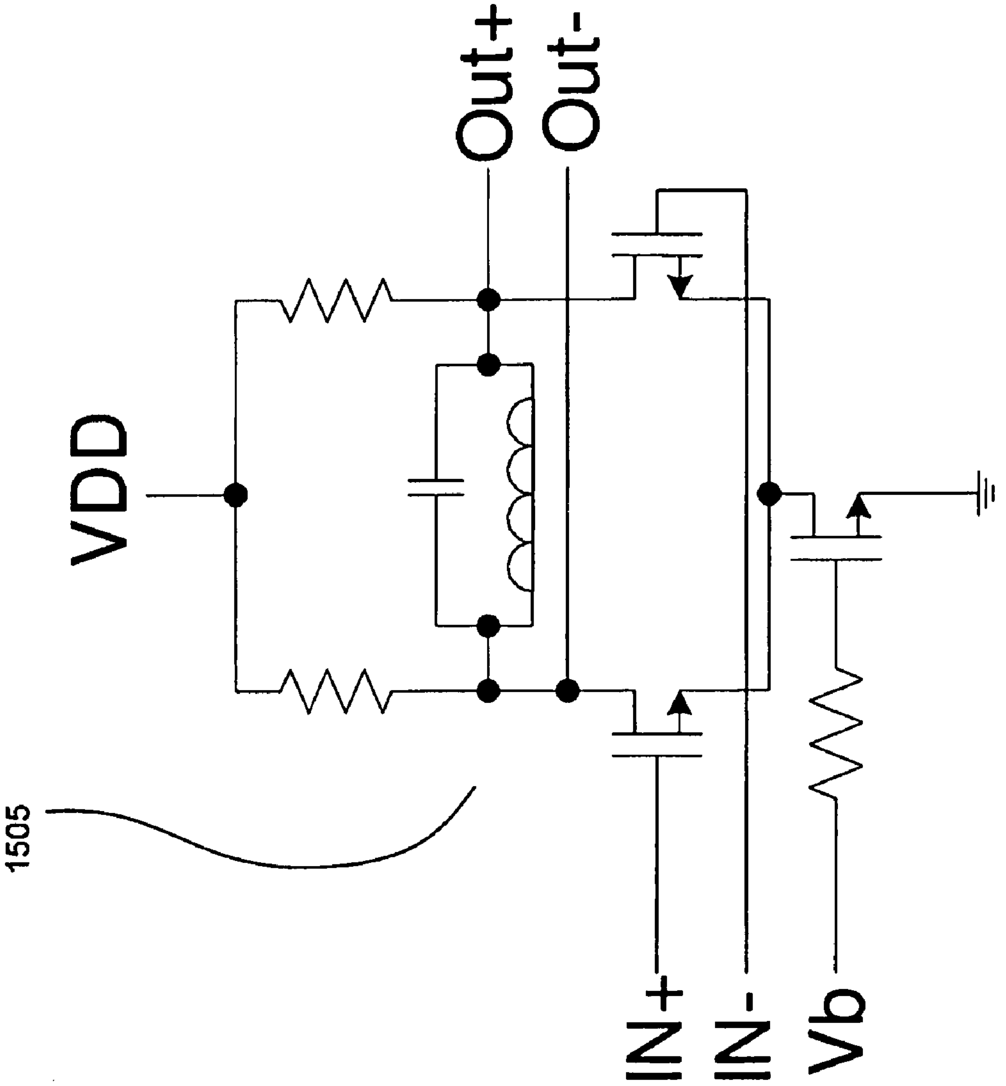
FIG. 18 illustrates a schematic of an active filter, in accordance with an exemplary embodiment of the present invention.

An active filter 1505 of the non-coherent MSK/ASK system 1500 can receive the IF 118. An exemplary schematic of the active filter 1505 is illustrated in FIG. 18. The active filter 1505 can provide an approximate 6 dB gain to the IF 118. Further, the active filter 1505 can include a tuned band-pass filter characteristic.

Figure 19:
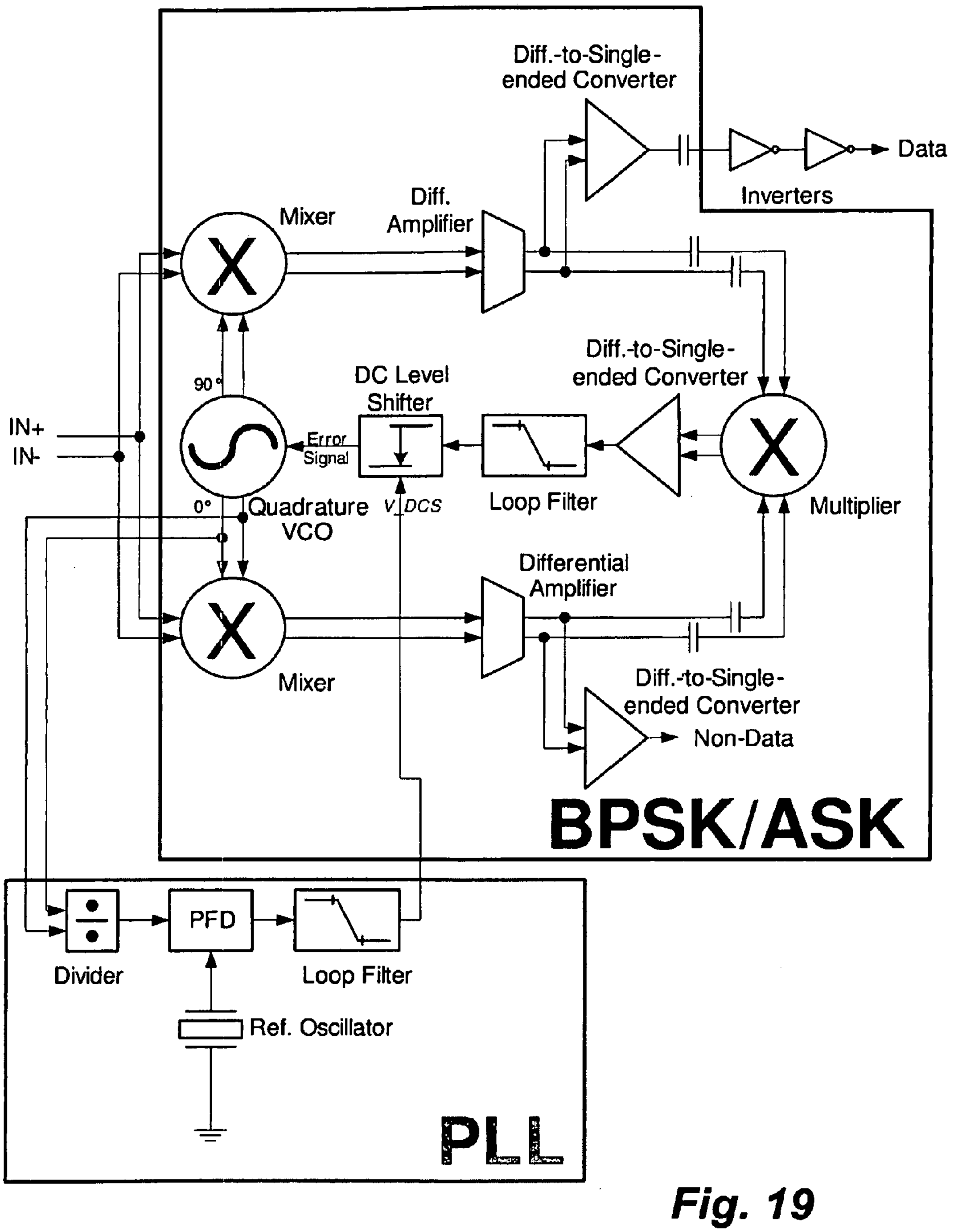
FIG. 19 illustrates a schematic of a phase-lock loop in relation to a BPSK/ASK part of the analog signal processor, in accordance with an exemplary embodiment of the present invention.

As for the PLL 1600, which is illustrated in both FIGS. 13 and 19, it is adapted to accurately set the oscillation frequency of the QVCO 130 in the coherent BPSK/ASK system 1400 of the analog signal processor 1300. Ideally, the output frequency of the QVCO 130 is close to what the circuit simulation shows. In reality, the frequency discrepancy could be large due to the unaccounted parasitic effect and the DC offset from any mismatch in the differential signal path. The PLL 1600 functions as a feedback mechanism to lock the oscillation frequency according to an external reference frequency (usually provided by an external crystal and reference oscillator).

The PLL comprises a divider 1605, which is preferably a divide-by-256 divider, a phase-frequency detector (PFD) 1610, an external crystal oscillator 1615 providing the reference frequency source, and a loop filter 1620. After the settling period of the PLL 1600, the output of the QVCO 130 is set at a frequency that is about 256 times the reference frequency.

Both the PLL 1600 and the BPSK/ASK system 1400 function as feedback loops that control the oscillation frequency of the QVCO 130. When the two feedback systems operate simultaneously, they work against each other and the analog signal processor may not able to continuously maintain a phase-lock with the incoming IF signal 118. This can cause an incorrect demodulation of the baseband signal during a short period of time. In order to resolve this conflict between the PLL 1600 and the BPSK/ASK system 1400, a memory cell circuit can be implemented.

Figure 20:
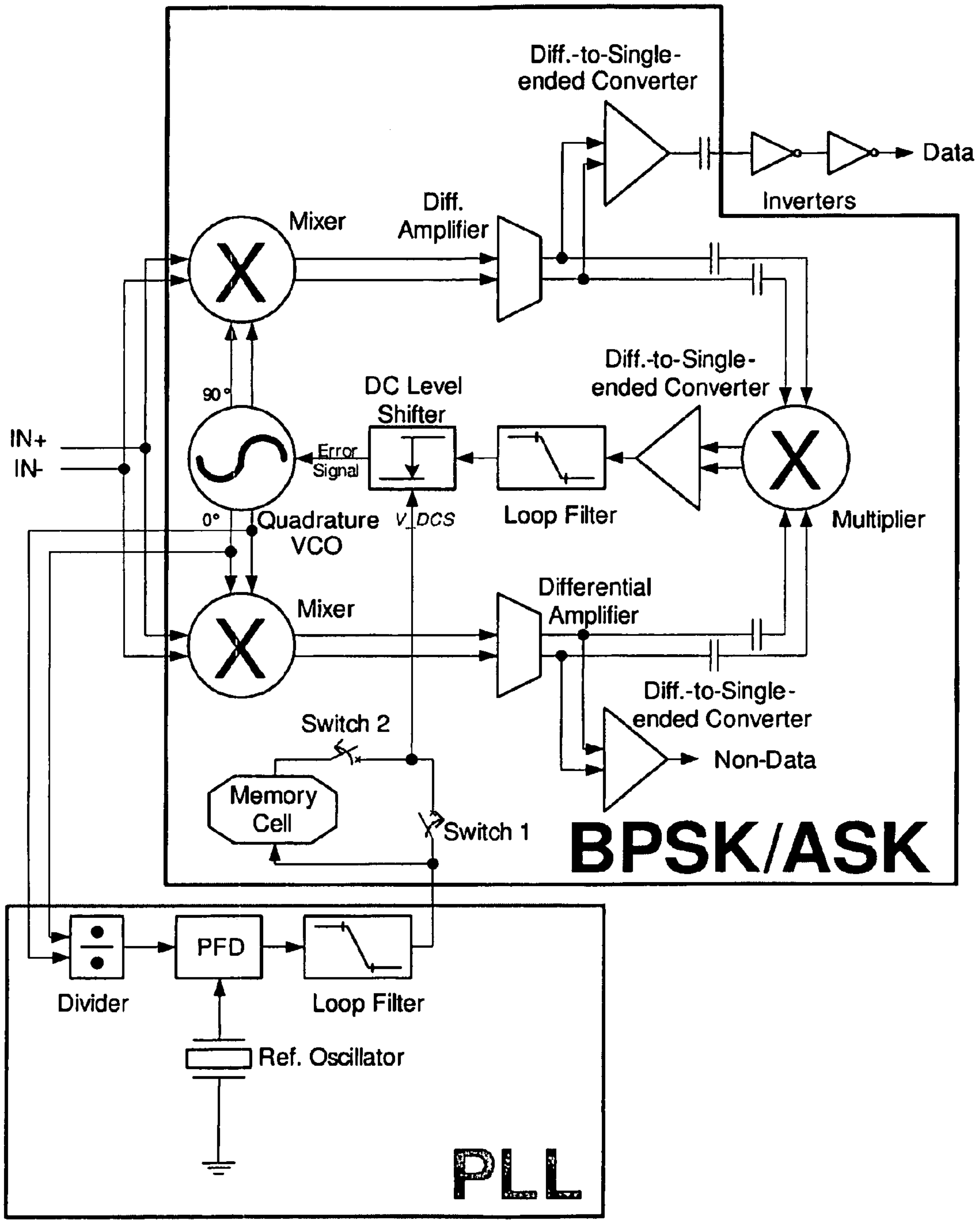
FIG. 20 illustrates a schematic of a memory cell circuit having phase-lock loop in the BPSK/ASK part of the analog signal processor, in accordance with an exemplary embodiment of the present invention.

Referring to FIG. 20, during the start-up phase of the coherent BPSK/ASK system 1400 (usually the settling time of the PLL), the PLL 1600 can first set the oscillation frequency of the QVCO 130 by adjusting the bias voltage of V_DCS. This voltage may be needed later during the analog signal processor coherent BPSK/ASK system 1400. Throughout this period, there is no incoming modulated IF signal 118, and hence the analog signal processor does not attempt to change the frequency of the QVCO 130. The voltage of V_DCS is then stored and inserted through properly turning off Switch 1 and turning on Switch 2.

Figure 21:
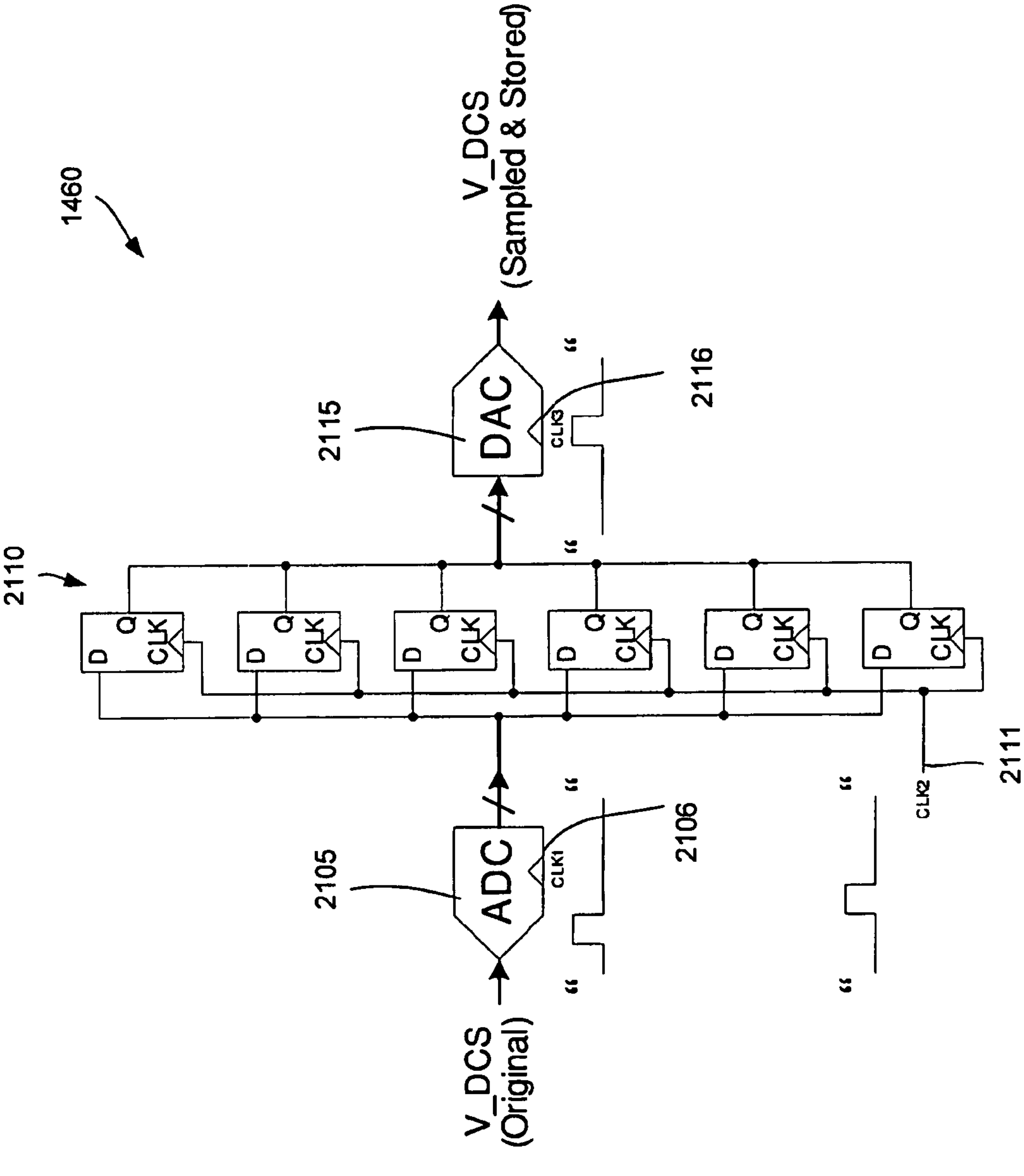
FIG. 21 illustrates a schematic of a memory cell circuit, in accordance with an exemplary embodiment of the present invention.
Figure 22:
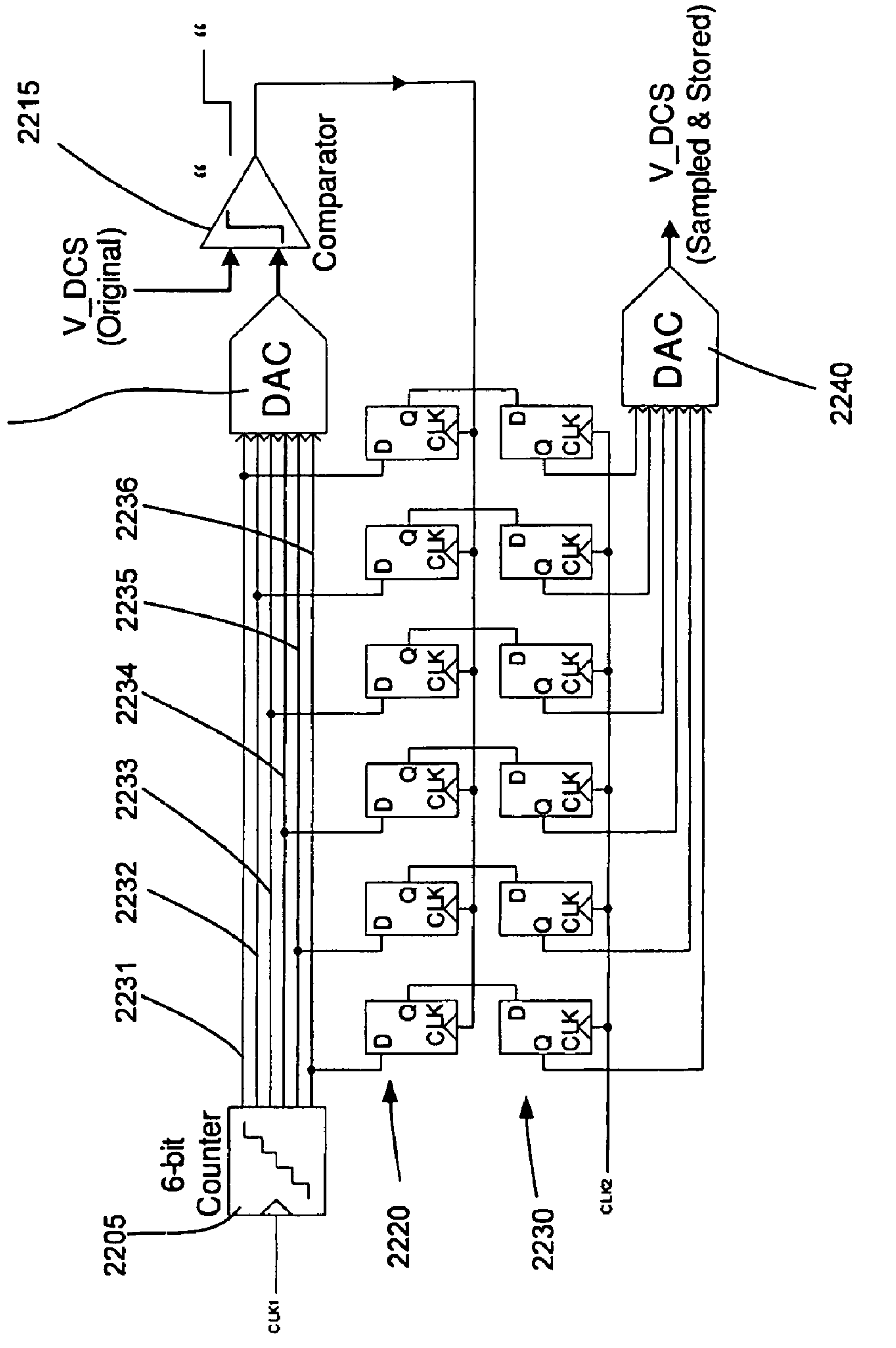
FIG. 22 illustrates a schematic of another memory cell circuit, in accordance with an exemplary embodiment of the present invention.

There are at least two preferred implementations of the memory cell circuit, as illustrated in FIGS. 21-22.

As illustrated in FIG. 21, a first implementation of the memory cell circuit 1460 is a method using an analog-to-digital converter (ADC) 2105, an array of D-flip-flops 2110 functioning as a primitive memory cell, and a digital-to-analog converter (DAC) 2115. The "number-of-bits" (depicted in FIG. 21 as 6-bits) needed for the ADC 2105 and the DAC 2115 can be dependent on the resolution requirement of the voltage being sampled. By means of properly timing the three clock signals—CLK1 2106 for ADC 2105, CLK2 2111 for the array of D-flip-flops 2110, and CLK3 2116 for DAC 2115—the voltage of V_DCS can be sampled and stored.

As illustrated in FIG. 22, a second implementation of the memory cell circuit 1460 uses a counter 2205 going through discrete output levels of a first DAC 2210 until a comparator 2215 is triggered by one voltage level that is the closest to the value of V_DCS. The same triggering initiates a first row of D-flip-flops 2220 (as shown the top row) to store the current counter bit-output 2231-2236 (depicted as 6-bits). This stored value is then latched into a second row of D-flip-flops 2230 (as shown the bottom row) functioning as a buffer. After the bottom D-flip-flops 2230 output the stored 6-bit value, a second DAC 2240 can generate the sampled and stored voltage of V_DCS.

The layout of the tri-mode analog signal processor 1300 can be approximately 0.98 mm by approximately 1.08 mm including all bonding pads. The layout of the implemented analog signal processor for the coherent BPSK/ASK operation with the QVCO is preferably performed with the STMicroelectronic's 90 nm CMOS process. The coherent system 1400 of the tri-mode analog signal processor 1300 preferably occupies an area of approximately 0.73 mm by approximately 0.62 mm, excluding any bonding pads. The overall power consumption can be approximately 70 mW from a single 1.8V supply, but can be reduced even further to approximately 50 mW with little performance deterioration. Sensitivity of the analog signal processor can be approximately 12 $mV_{P-P}$ with a dynamic range of approximately 14 dB. The analog signal processor can be capable of coherently demodulating a raw speed of more than approximately 3.5 Gbps BPSK/ASK with a locking range of more than ±100 MHz. From the start-up, it takes approximately 5 ns (there is an intentional of 5 ns delay before the simulation data is inserted) for the analog signal processor to lock onto the incoming IF signal.

PCIe Embodiment

At the end of 2006, the PCI express (PCIe), which is a computer extension card interface format, penetrated over 90% of the personal computer market. As a result, PCIe is an interface of choice for ultra-high-speed wireless systems.

Wireless PCI-Express interface (W-PCIe) can be implemented in an analog millimeter-waves (57-64 GHz, 71-76 GHz and/or 81-86 GHz) wireless front-end system. For instance, U.S. patent application Ser. No. 11/394,498, filed 31 Mar. 2006, assigned to the same assignee of the present application, the entire disclosure of which is incorporated herein by reference, describes analog front-end technology. In addition, the use of Fiber Channel technology can be used to bring more flexibility and more functionality to the system. The use of PCIe and Fiber Channel as direct interface with the analog millimeter-waves front-end defines a novel wireless system can be referred to as a Wireless Storage Area Network (W-SAN).

The PCIe link can be built around a bidirectional, serial (1-bit), point-to-point connection known as a "lane". This is in sharp contrast to the PCI connection, which is a bus-based system where all the devices share the same unidirectional, 32-bit, parallel bus.

PCIe is a layered protocol, comprising a Transaction Layer, a Data Link Layer, and a Physical Layer. The Physical Layer can be further divided into a logical sub-layer and an electrical sublayer. The logical sublayer can be further divided into a Physical Coding Sublayer (PCS) and a Media Access Control (MAC) sublayer.

At the electrical level, each lane utilizes two unidirectional low voltage differential signaling (LVDS) pairs at 2.5 gigabit. Transmit and receive are separate differential pairs, for a total of 4 data wires per lane. The PCIe protocols can be set to be unidirectional only.

First, the PCIe protocols can be dynamically set to accommodate a Time-Division-Multiple-Access data transfer. Then, an analog driver can be used to drive directly an analog millimeter-waves (e.g., 57-64 GHz, 71-76 GHz and/or 81-86 GHz) wireless front-end.

Figure 23:
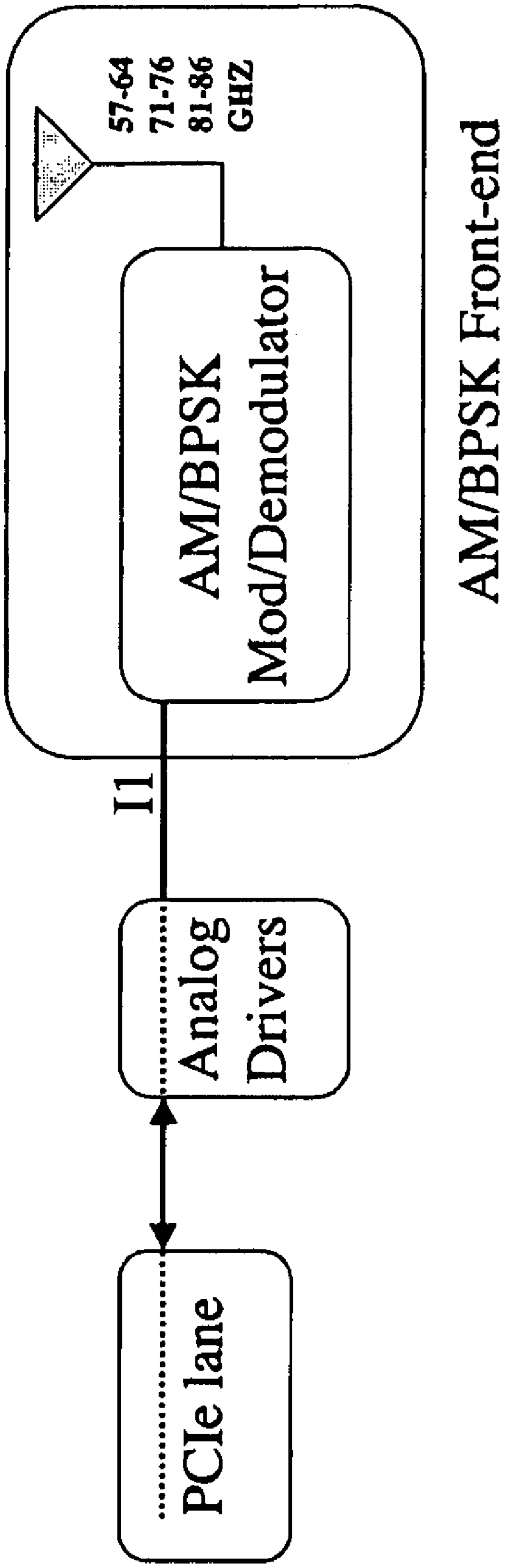
FIG. 23 illustrates a single PCIe lane interface with AM/BPSK analog millimeter waves (57-64, 71-76, and/or 81-86 GHz) wireless front-end, in accordance with an exemplary embodiment of the present invention.

A single PCIe lane can be wirelessly transferred using an AM/BPSK front-end supporting up to 2.5 Gbps as illustrated in FIG. 23.

Figure 24:
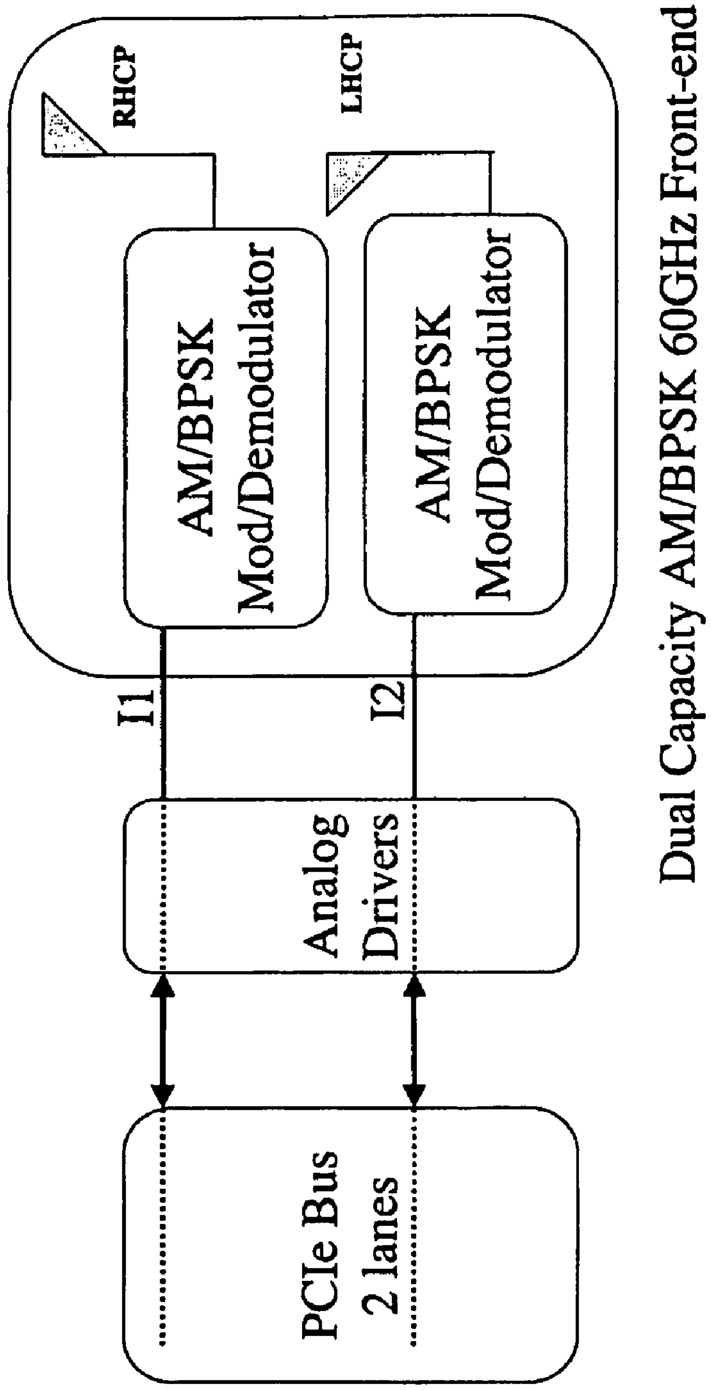
FIG. 24 illustrates two PCIe lanes interface with dual capacity AM/BPSK analog millimeter waves (57-64, 71-76, and/or 81-86 GHz) wireless front-end, in accordance with an exemplary embodiment of the present invention.

Two PCIe lanes can be wirelessly transferred using a Dual Capacity AM/BPSK front-end supporting up to 5 Gbps as illustrated in FIG. 24.

Figure 25:
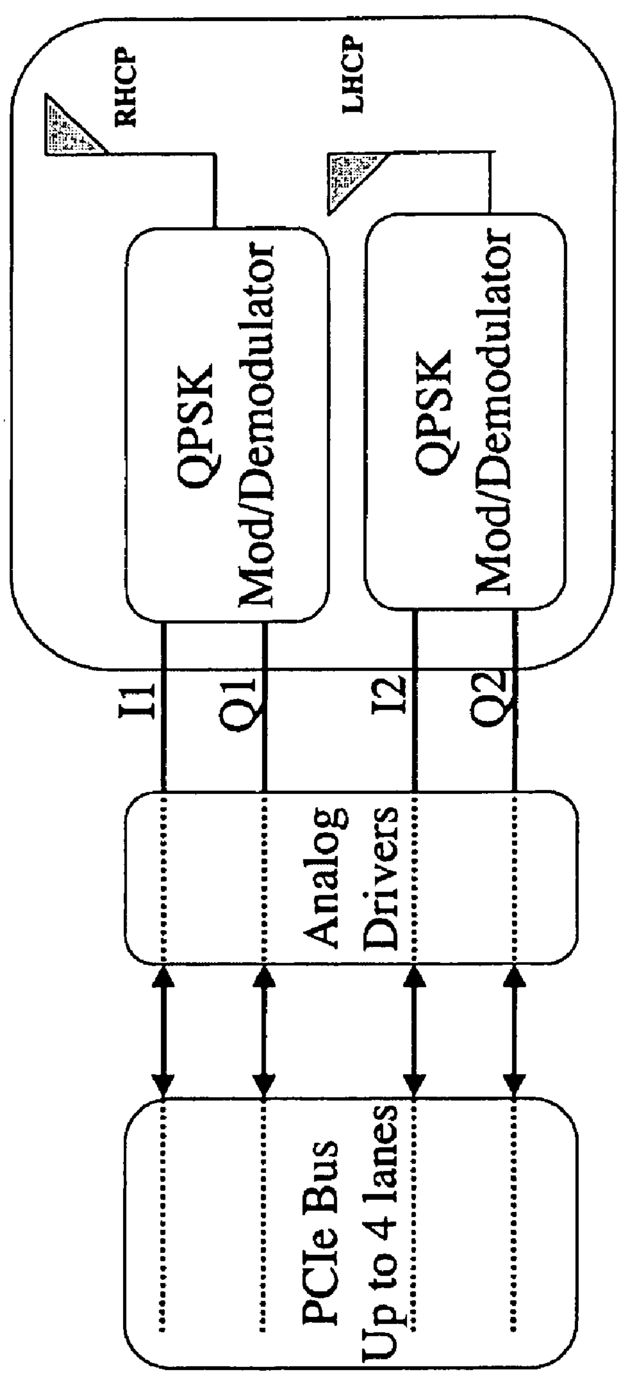
FIG. 25 illustrates dual capacity QPSK analog millimeter waves (57-64 GHz) wireless front end, in accordance with an exemplary embodiment of the present invention.

Four PCIe lanes can be wirelessly transferred using a Dual Capacity QPSK front-end supporting up to 10 Gbps as shown in FIG. 25.

Figure 26:
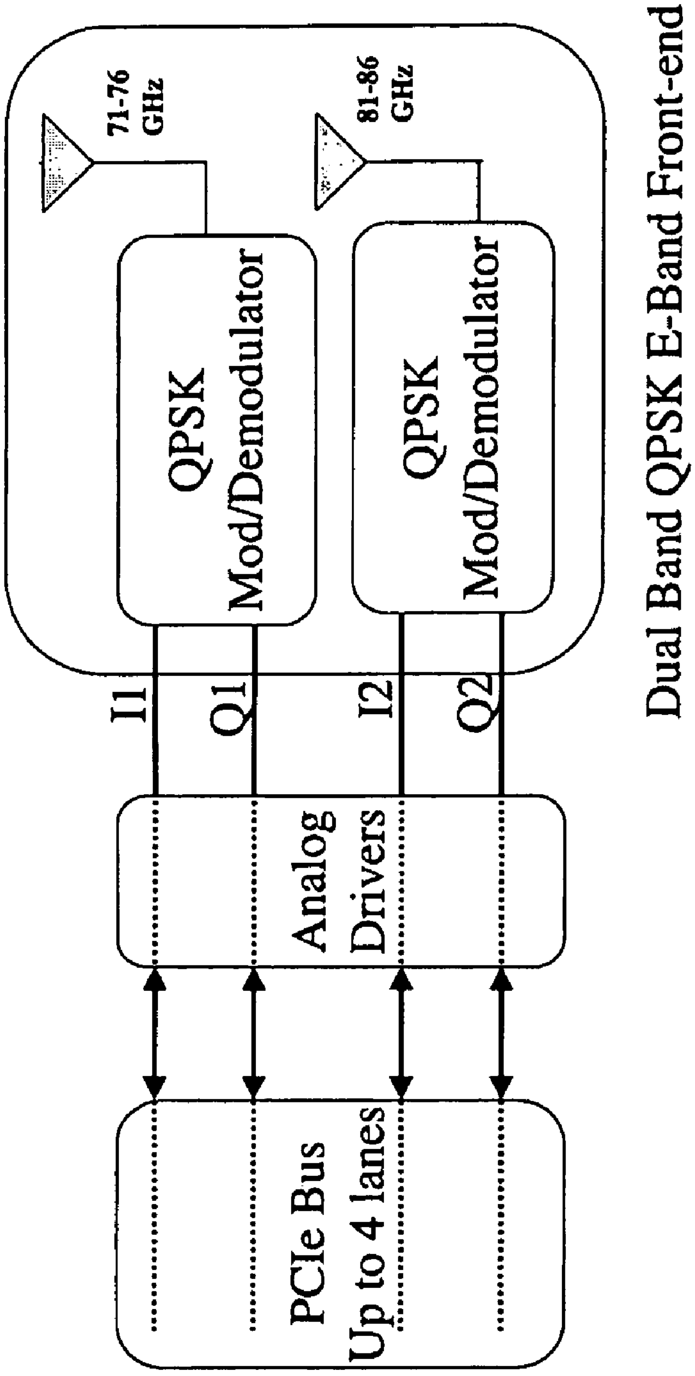
FIG. 26 illustrates dual band QPSK E-band analog millimeter waves (71-76 and 81-86 GHz) wireless front-end, in accordance with an exemplary embodiment of the present invention.

Four PCIe lanes can be wirelessly transferred using a Dual Band QPSK front-end supporting up to 10 Gbps as shown in FIG. 26.

Figure 27:
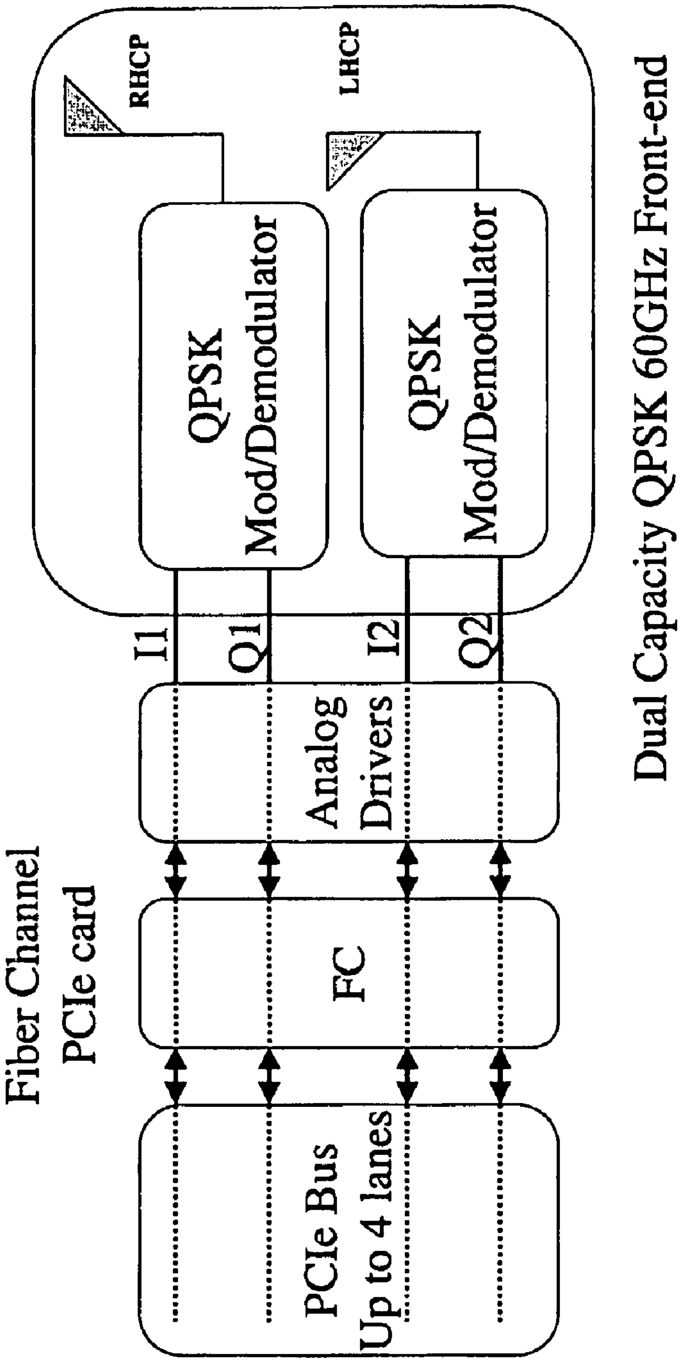
FIG. 27 illustrates four PCIe lane interface with four channels Fiber Channel Card and a dual capacity QPSK analog millimeter-waves wireless front-end, in accordance with an exemplary embodiment of the present invention.
Figure 28:
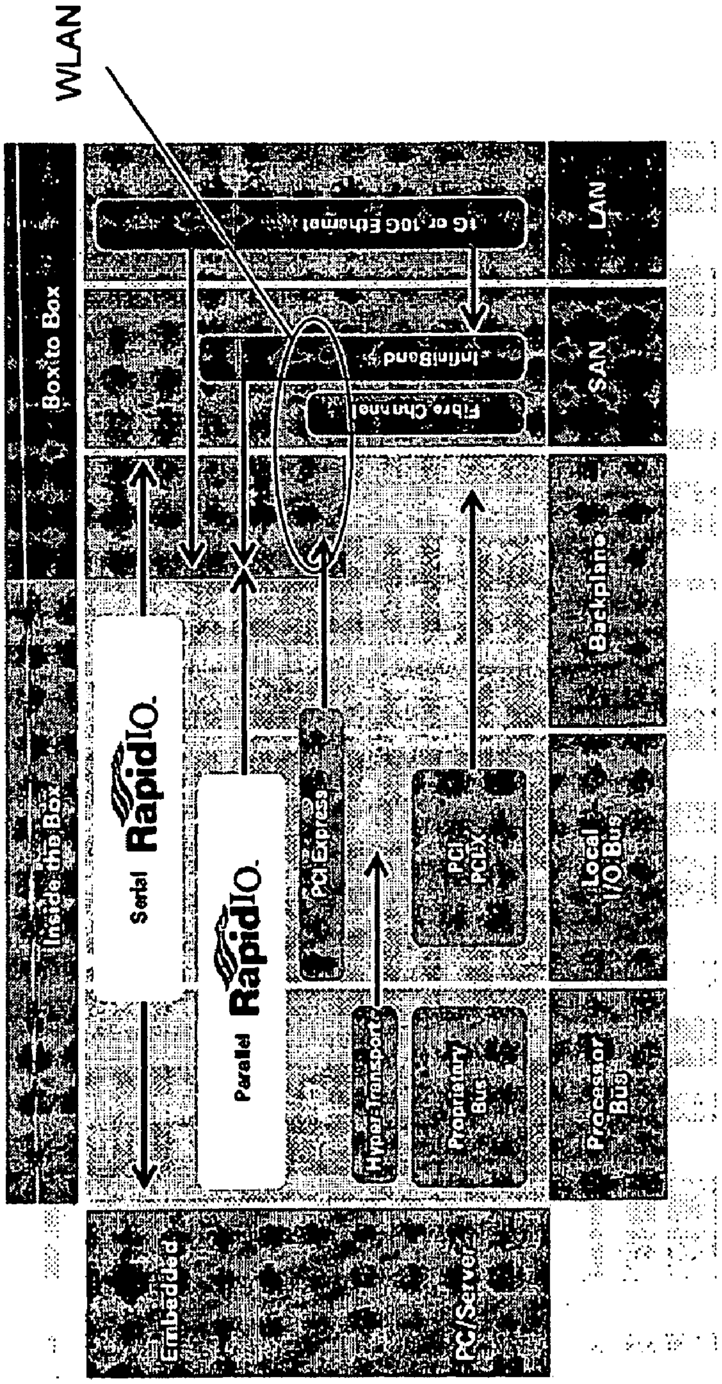
FIG. 28 illustrates a wireless storage area network (W-SAN), in accordance with an exemplary embodiment of the present invention.

Alternatively, the design can use Copper Fiber Channel technology to interface PCIe and the analog millimeter-waves wireless front-end. The Copper Fiber Channel (FC) Technology is used to bring more flexibility and more functionality when, for example, data is sunk from the multiple storage systems. The analog drivers are then used between FC and the analog millimeter-waves wireless front-end as indicated for example as depicted in FIG. 27.

Figure 29:
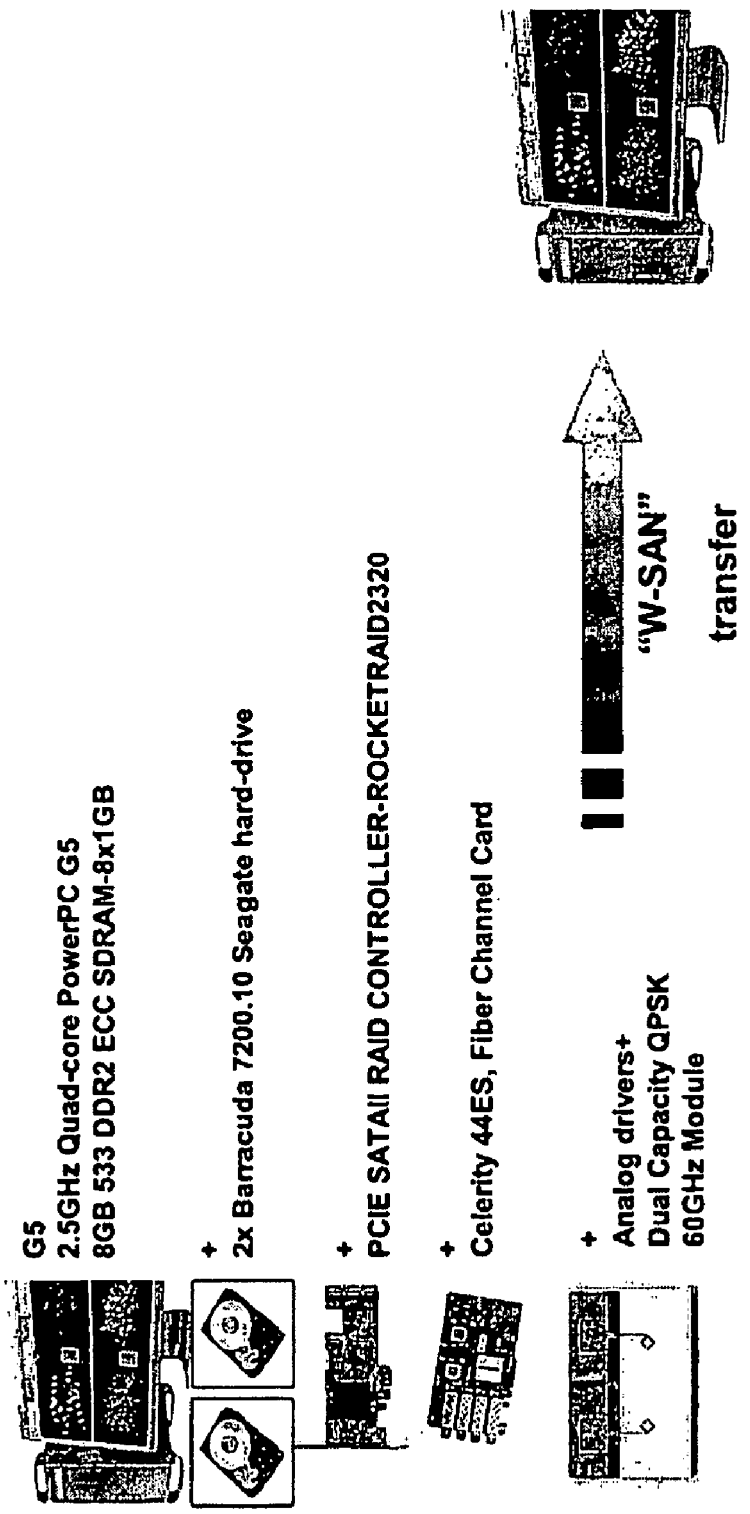
FIG. 29 illustrates a system configuration dedicated to W-SAN transfer, in accordance with an exemplary embodiment of the present invention.

The use of PCIe and Fiber Channel as direct interface with the analog millimeter-waves front-end defines a new wireless system that can be hereby referred to as Wireless Storage Area Network (W-SAN). An example of a W-SAN system configuration that can exploit the maximum system bandwidth available using commercial electronic equipment is depicted in FIG. 29. In addition, Port Multiplication Techniques (PM) can be used to increase the sustained data rate by combining the throughput of several hard-drives.

Figure 30:
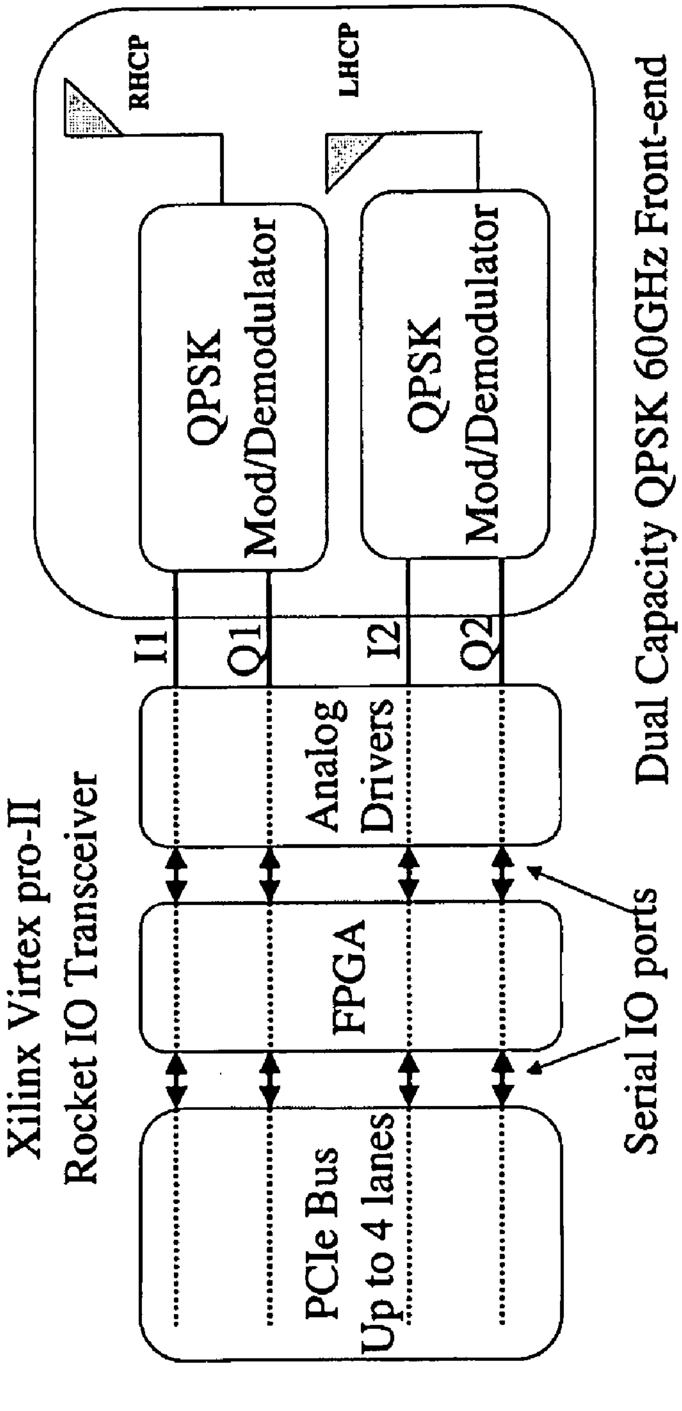
FIG. 30 illustrates four PCIe lane interface with a FPGA based serial transceiver and a dual capacity QPSK analog millimeter-waves wireless front-end, in accordance with an exemplary embodiment of the present invention.

Also, a FPGA based serial transceiver (for example Xilinx® Virtex ProII, and/or rocket IO Multigigabit Transceiver) can be used to interface PCIe with the analog millimeter-wave front-end. The high-speed serial I/O ports are used to receive and send the data from the PCIe bus and the analog millimeter-wave front-end, which is depicted in FIG. 30. Specifically, FIG. 30 illustrates four PCIe lane interfaces with FPGA based serial transceivers and a dual capacity QPSK analog millimeter waves wireless front-end.

While the invention has been disclosed in its preferred forms, it will be apparent to those skilled in the art that many modifications, additions, and deletions can be made therein without departing from the spirit and scope of the invention and its equivalents, as set forth in the following claims.

What is claimed is:

1. A method of generating an error signal in an analog domain, the method comprising:

providing a first amplifier divider for generating two output signals;

providing a second amplifier divider for generating two output signals;

feeding a first signal from the first amplifier divider to a first multiplier;

feeding a first signal from the second amplifier divider to the first multiplier;

feeding a second signal from the first amplifier divider to a second multiplier;

feeding a second signal from the second amplifier divider to the second multiplier;

converting the outputs of the first multiplier to single output; and converting the outputs of the second multiplier to single output.

2. The method according to claim 1, further comprising feeding an input of the first amplifier divider with a signal from a first mixer, and feeding an input of the second amplifier divider with a signal from a second mixer.

3. The method according to claim 2, further comprising providing an intermediate frequency to the first and second mixers, and providing a signal from an oscillator to the first and second mixers.

4. The method according to claim 1, further comprising feeding the output of the first multiplier to a first differential-to-single ended amplifier, and feeding the output of the second amplifier to a second differential-to-single ended amplifier.

5. The method according to claim 4, further comprising feeding both an output of the first differential-to-single ended amplifier and an output of the second differential-to-single ended amplifier to a high gain differential amplifier for amplifying the difference between the two amplifiers, the high gain amplifier comprising first and second inputs and an output.

6. The method according to claim 5, further comprising feeding the output of the high gain amplifier to a low pass filter for filtering, the low pass filter comprising an input and an output.

7. The method according to claim 6, further comprising feeding the output of the low pass filter to a common emitter buffer for buffering, the common emitter buffer comprising an input and an output.

8. The method according to claim 7, the common emitter buffer performing as a DC-level shifter to set a bias point suitable for operation of an oscillator.

9. The method according to claim 7, further comprising feeding the output of the common emitter buffer to an oscillator voltage control input.

10. The method according to claim 9, the oscillator comprising a quadrature voltage controlled oscillator.

11. The method according to claim 9, wherein the output of the common emitter buffer comprises an error signal and provides control voltage to the oscillator.

12. The method according to claim 1, wherein each of the first and second amplifier dividers comprise at least five differential amplifiers.

13. The method according to claim 1, the first and second multipliers comprise a Gilbert-cell multiplier.

14. The method according to claim 1, wherein a higher gain path is connected to an input of a local oscillator of the first and second multipliers, and a lower gain path is connected to an RF input of the first and second multipliers.

15. The method according to claim 14, wherein a ratio of voltage gain between the two outputs of the first and second amplifier dividers is approximately 5:2.

16. The method according to claim 14, the first and second amplifier dividers are adapted to arrange delay between the high gain path and the low gain path of the first and second amplifier dividers output.

17. An analog signal processor comprising:

a first amplifier divider for generating differential outputs;

a second amplifier divider for generating differential outputs;

a first multiplier for multiplying received signals; and a second multiplier for multiplying received signals;

wherein a first output of the first amplifier divider is coupled to the first multiplier, and a second output of the first amplifier divider is coupled to the second multiplier, and wherein a first output of the second amplifier divider is coupled to the second multiplier, and a second output of the second amplifier divider is coupled to the first multiplier.

18. The analog signal processor according to claim 17, wherein the first multiplier multiplies the first output of the first amplifier divider with the second output of the second amplifier divider to create an output for the first multiplier.

19. The analog signal processor according to claim 17, wherein the second multiplier multiplies the second output of the first amplifier divider with the first output of the second amplifier divider to create an output for the second multiplier.

20. The analog signal processor according to claim 17, wherein an output of the first multiplier is coupled to an input of a first differential-to-single-ended amplifier and an output of the second multiplier is coupled to an input of a second differential-to-single-ended amplifier.

21. The analog signal processor according to claim 20, wherein the outputs of the first and second differential-to-single-ended converters are inputs to a high gain differential amplifier for amplification, the high gain amplifier comprising an output.

22. The analog signal processor according to claim 21, the output of the high gain amplifier is coupled to an input of a low pass filter, the low pass filter comprising an output.

23. The analog signal processor according to claim 22, the output of the low pass filter is coupled to an input of a buffer, the buffer comprising an output.

24. The analog signal processor according to claim 23, the output of the buffer is coupled to an oscillator.

25. The analog signal processor according to claim 24, the oscillator comprising a voltage-controlled oscillator.

26. The analog signal processor according to claim 25, the oscillator comprising a quadrature voltage controlled oscillator.

27. The analog signal processor according to claim 25, further comprising:

a first mixer for mixing two or more signals to provide an output; and a second mixer for mixing two or more signals to provide an output;

wherein the oscillator is coupled to both the first and second mixers.

28. The analog signal processor according to claim 27, further comprising an intermediate frequency coupled to the first and second mixers.

29. The analog signal processor according to claim 27, wherein the first amplifier divider comprises at least five differential amplifiers.

30. The analog signal processor according to claim 27, wherein the second amplifier divider comprises at least five differential amplifiers.

31. A method of generating an error signal in an analog domain, the method comprising:

providing a first amplifier divider for generating two output signals;

providing a second amplifier divider for generating two different output signals;

providing at least one capacitor at each of the outputs of the first and second amplifier dividers;

feeding a first signal from the first amplifier divider through a first capacitor to a first multiplier;

feeding a first signal from the second amplifier divider through a second capacitor to the first multiplier;

feeding a second signal from the first amplifier divider through a third capacitor to a second multiplier;

feeding a second signal from the second amplifier divider through a fourth capacitor to the second multiplier;

converting the outputs of the first multiplier to a signal output; and converting the outputs of the second multiplier to a signal output.

* * * * *